(12) United States Patent
Peters et al.

(10) Patent No.: US 11,890,693 B2
(45) Date of Patent: Feb. 6, 2024

(54) SYSTEMS AND METHODS FOR DETERMINING CHARACTERISTICS OF A WORKPIECE IN A PLASMA ARC PROCESSING SYSTEM

(71) Applicant: Hypertherm, Inc., Hanover, NH (US)

(72) Inventors: John Peters, Canaan, NH (US); Jeff Ortakales, Newbury, NH (US); Mirko Milaneschi, Follonica (IT); Dana Labrecque, Plainfield, NH (US); Norman LeBlanc, Claremont, NH (US); Richard Glen Robinson, Canaan, NH (US); Brett A. Hansen, Mapleton, UT (US); Georgios E. Gkatzimas, Salonika (GR)

(73) Assignee: Hypertherm, Inc., Hanover, NH (US)

( * ) Notice: Subject to any disclaimer, the term of this patent is extended or adjusted under 35 U.S.C. 154(b) by 186 days.

(21) Appl. No.: 17/205,821

(22) Filed: Mar. 18, 2021

(65) Prior Publication Data
US 2021/0291290 A1    Sep. 23, 2021

Related U.S. Application Data

(60) Provisional application No. 62/991,272, filed on Mar. 18, 2020.

(51) Int. Cl.
*B23K 10/00* (2006.01)
*H05H 1/34* (2006.01)
*H05H 1/36* (2006.01)

(52) U.S. Cl.
CPC ......... *B23K 10/006* (2013.01); *H05H 1/3494* (2021.05); *H05H 1/36* (2013.01)

(58) Field of Classification Search
CPC ....... H05H 1/36; H05H 1/3494; B23K 10/006
(Continued)

(56) References Cited

U.S. PATENT DOCUMENTS

| 4,877,940 | A | | 10/1989 | Bangs et al. | |
|---|---|---|---|---|---|
| 5,326,955 | A | * | 7/1994 | Nishi | B23K 10/006 |
| | | | | | 219/121.57 |

(Continued)

FOREIGN PATENT DOCUMENTS

DE         19548606 A1 *  3/1997  .......... B23K 10/006

OTHER PUBLICATIONS http://prospot.com/products/i5/#auto-weld, printed on Apr. 23, 2021.

*Primary Examiner* — Jimmy Chou
(74) *Attorney, Agent, or Firm* — Cesari and McKenna, LLP

(57) ABSTRACT

A computerized method is provided for automatically determining at least one characteristic of a workpiece for processing by a plasma arc processing system. The method includes electrically connecting the workpiece to the plasma arc processing system that includes a plasma arc torch. A distal tip of the plasma arc torch is configurable to be positioned proximate to the workpiece. The method includes supplying, by the plasma arc processing system, an electrical current with a low amperage to the workpiece, the low amperage current insufficient to cut the workpiece, and monitoring, by the plasma arc processing system, a path of the electrical current relative to the workpiece. The method further includes determining, by the plasma arc processing system, the at least one characteristic of the workpiece based on the electrical current path monitored.

33 Claims, 19 Drawing Sheets

(58) Field of Classification Search
USPC .................................................. 219/121.44
See application file for complete search history.

(56) References Cited

U.S. PATENT DOCUMENTS

| | | | |
|---|---|---|---|
| 5,357,096 A | 10/1994 | Koike et al. | |
| 6,369,350 B1* | 4/2002 | Norris .................... | H05H 1/36 |
| | | | 219/121.57 |
| 9,630,273 B2* | 4/2017 | Peters .................... | B23K 10/00 |
| 11,548,090 B2* | 1/2023 | Nowak .................... | H05H 1/36 |
| 2004/0045942 A1* | 3/2004 | Norris .................. | B23K 10/006 |
| | | | 219/121.57 |
| 2005/0061784 A1* | 3/2005 | Matus .................... | H05H 1/36 |
| | | | 219/121.54 |
| 2006/0163220 A1* | 7/2006 | Brandt .................... | H05H 1/36 |
| | | | 219/121.55 |
| 2008/0083713 A1* | 4/2008 | Sanders ............... | B23K 9/0671 |
| | | | 219/121.57 |
| 2008/0083714 A1* | 4/2008 | Kamath .................. | H05H 1/36 |
| | | | 219/121.57 |
| 2008/0192897 A1 | 8/2008 | Piorek et al. | |
| 2015/0146218 A1* | 5/2015 | Kerscher ................. | G01V 8/10 |
| | | | 356/625 |
| 2015/0283640 A1* | 10/2015 | Walker .................... | H05H 1/34 |
| | | | 219/130.01 |
| 2016/0354856 A1* | 12/2016 | Peters ................. | B23K 10/006 |
| 2017/0095879 A1* | 4/2017 | Mitra .................. | B23K 10/006 |
| 2018/0236588 A1* | 8/2018 | Namburu ............... | B23K 10/00 |
| 2018/0361497 A1* | 12/2018 | Nowak .................... | H05H 1/36 |
| 2020/0114450 A1* | 4/2020 | Kulakowski ............ | G06F 18/00 |

* cited by examiner

SYSTEMS AND METHODS FOR DETERMINING CHARACTERISTICS OF A WORKPIECE IN A PLASMA ARC PROCESSING SYSTEM

CROSS REFERENCE TO RELATED APPLICATION

This application claims the benefit of and priority to U.S. Provisional Patent Application No. 62/991,272, filed on Mar. 18, 2020, the entire content of which is owned by the assignee of the instant application and incorporated herein by reference in its entirety.

TECHNICAL FIELD

The present invention relates generally to systems and methods for automatically determining one or more characteristics of a workpiece in a plasma arc processing system.

BACKGROUND

Plasma arc torches are widely used for high temperature processing (e.g., cutting, welding, and marking) of metallic materials. A plasma arc torch generally includes a torch body, an electrode mounted within the body, an emissive insert disposed within a bore of the electrode, a nozzle with a central exit orifice, a shield, electrical connections, passages for cooling and arc control fluids, a swirl ring to control the fluid flow patterns, and a power supply. The plasma arc torch can produce a plasma arc, which is a constricted, ionized jet of plasma gas with high temperature and high momentum. Gases used in the torch can be non-reactive (e.g., argon or nitrogen) or reactive (e.g., oxygen or air).

In today's market, it is expensive and time consuming to identify certain characteristics of a workpiece prior to processing by a plasma arc torch. These characteristics include the material type, thickness and/or boundary of the workpiece, which are important factors that need to be considered when configuring the torch system for workpiece processing. Specifically, these characteristics are crucial for a number of decisions regarding manufacturing setup of a plasma arc processing system, including initial workpiece alignment, workpiece remnant usage, skeleton cut-up or expanded metal cutting, edge starting, gas selection, current selection, torch motion selection and ways of cutting features on a part edge. Without knowing these characteristics a priori, cutting standard formats (e.g., squares or rectangles) from raw workpieces that have undefined and/or irregular edges (i.e., plates out of a foundry) can be a process that is time consuming, wasteful and/or require additional expensive processing equipment. For example, an operator may need to manually eliminate these irregular edges, but may waste portions of the workpiece unnecessarily in the process.

Currently, there exists a few approaches for determining the boundary of a workpiece and/or where to cut the workpiece to generate standard-format workpieces. Most of these approaches involve using cutting programs that start with a pierce inside of the workpiece (as opposed to start a cut from the edge of the workpiece) and run a long cutting path that ends the cut outside of the workpiece by running off of the workpiece. While such approaches avoid the risk of starting the arc too far off of the workpiece or ending the cut too soon and leaving the irregular edge still attached to the final product, they significantly shorten the life of consumables of the plasma arc torches used for the cutting by requiring these torches to start a cut with a difficult pierce and end the cut with a ramp down error that adversely impacts consumable life. In addition, by piercing inside of a workpiece, the plasma arc processing system is limited to a workpiece thickness that can be handled by the maximum piercing capability of the system.

Other approaches utilize workpiece mapping to determine the boundary of the workpiece prior to processing, such as photographing the workpiece using cameras and/or optical devices, scanning the workpiece in either 2D or 3D, or sampling the workpiece border using an optical teach-trace tool (see, e.g., the tool described in U.S. Pat. No. 5,357,096. In the case where an operator chooses to use a camera, the workpiece is photographed and the resulting images are processed and analyzed off-line, such as converted into DXF files that include a reference point indicating where the images were taken (e.g., camera position(s) at the time of capture). The camera can be a webcam controllable and repositionable by a computer-numerical controller (CNC) of the plasma arc processing system or an independent/separate camera. In the case where an operator employs the surface scan approach, the workpiece is scanned and analyzed off-line to convert the scans into DXF files that include its reference point. In the case where an operator employs an optical teach-trace tool to map the workpiece border, a "cutting program" of the workpiece is created and analyzed off-line to be reverse-engineered into DXF files. Even though these approaches provide complete information about the borders of a workpiece, the accuracy of such determination is poor and subject to large variabilities (e.g., shadows, shape of the edge, etc.). Additionally, the equipment used (e.g., cameras and optics) can be affected by cutting smoke, pollution and other environmental factors. Further, the scanning heads used in the surface scan approach and the sampling heads used in the sample mapping approach are difficult to find and/or expensive to purchase.

Yet another disadvantage of the existing approaches is that even when the boundary of a workpiece is determined, current plasma arc processing systems still require an operator to manually change settings (e.g., amperage, pressure, etc.) to optimize results for a specific material type and/or thickness of the workpiece. Not only does this take time but also introduces potential for user error, such as via incorrect thickness determination, incorrect material identification, etc., and requires the operator to know what the correct/optimal settings are.

Therefore, there is a need for systems and methods that can automatically identify certain characteristics of a workpiece (e.g., workpiece boundary, thickness and/or material type) to improve operation cost, processing efficiency and consumable life.

SUMMARY

The present invention provides techniques for automatically determining one or more characteristics of a workpiece (e.g., workpiece thickness, material type, shape, dimensions, etc.) in a plasma arc processing system. In some embodiments, these techniques utilize current detection through the nozzle of a plasma arc torch or through the workpiece to determine workpiece boundary, workpiece material thickness, and/or workpiece material type. These characteristics can be monitored and used to adjust manufacturing process performance.

The invention, in one aspect, features a computerized method for automatically determining at least one characteristic of a workpiece for processing by a plasma arc processing system. The method includes electrically connecting the workpiece to the plasma arc processing system that includes a plasma arc torch. A distal tip of the plasma arc torch is configurable to be positioned proximate to the workpiece. The method includes supplying, by the plasma arc processing system, an electrical current with a low amperage to the workpiece, the low amperage current insufficient to cut the workpiece. The method also includes monitoring, by the plasma arc processing system, a path of the electrical current relative to the workpiece. The method further includes determining, by the plasma arc processing system, the at least one characteristic of the workpiece based on the electrical current path monitored.

In another aspect, the present invention features a computer-implemented plasma arc processing system for automatically determining at least one characteristic of a workpiece for processing the workpiece. The system includes a plasma arc torch comprising a proximal end and a distal end. The distal end of the plasma arc torch is configurable to be positioned proximate to the workpiece to process the workpiece. The system includes a work clamp configured to secure to the workpiece in preparation for processing by the plasma arc torch. The system also includes a power supply in electrical communication with the plasma arc torch and the work clamp. The power supply is configured to supply a low-amperage electrical current to the workpiece, where the low amperage current is insufficient to cut the workpiece. The system further includes a processor in electrical communication with the plasma arc torch, the work clamp and the power supply. The processor is configured to monitor a path of the electrical current relative to the workpiece and determine the at least one characteristic of the workpiece based on the electrical current path monitored.

Any of the above aspects can include one or more of the following features. In some embodiments, a process to be performed on the workpiece by the plasma arc torch is adjusted based on the at least one characteristic of the workpiece determined. In some embodiments, the plasma arc processing system, such as the power supply of the system, supplies the electrical current to the workpiece via a plasma arc generated by the plasma arc torch. The plasma arc torch can support the plasma arc with a non-oxidizing gas, such as argon.

In some embodiments, the plasma arc torch is translated relative to the workpiece and the plasma arc torch generates the plasma arc during the torch translation. The path of the electrical current carried by the plasma arc is monitored as the plasma arc torch translates relative to the workpiece over time. In this case, the at least one characteristic of the workpiece is a boundary of the workpiece determined based on variations in the monitored electrical current path over time during the translation. In some embodiments, determining the path of the electrical current comprises determining if the electrical current travels through the workpiece or through a nozzle of the plasma arc torch without contacting the workpiece. In some embodiments, the electrical current traveling through the workpiece indicates the plasma arc impinging on the workpiece and the electrical current returning without contacting the workpiece indicates the plasma arc encountering a void region within an outer boundary of the workpiece or beyond the outer boundary of the workpiece. In some embodiments, a direction of translation of the plasma arc torch is adjusted before the plasma arc torch translating more than a predefined distance into the void region. In some embodiments, the plasma arc impinging on the workpiece marks the workpiece without cutting the workpiece. In some embodiments, a perimeter of the workpiece is mapped by translating the plasma arc torch in at least one of a substantially serpentine or stepwise path relative to the workpiece.

In some embodiments, the at least one characteristic of the workpiece determined comprises a threshold of supplied electrical current at or above which the electrical current path travels through the workpiece such that the plasma arc marks the workpiece. In this case, the plasma arc torch is translated relative to the workpiece. The plasma arc torch generates the plasma arc during the torch translation. The electrical current supplied by the plasma arc torch is controllably increased or decreased relative to the threshold electrical current while translating the plasma arc torch to mark a desired pattern on the workpiece. In some embodiments, decreasing the electrical current below the threshold electrical current electrically disconnects the plasma arc from the workpiece to prevent marking of the workpiece, such that the electrical current path returns through a nozzle of the plasma arc torch without contacting the workpiece. In some embodiments, the threshold electrical current is about 5 amps.

In some embodiments, the plasma arc processing system supplies the electrical current to the workpiece via a work clamp connected to the plasma arc processing system. In this case, the at least one characteristic of the workpiece can be one of thickness, resistivity or material type of the workpiece. In some embodiments, the work clamp includes a sensor configured to determine a thickness of the workpiece based on the electrical current path. In some embodiments, the work clamp includes at least two wires for delivering the electrical current to the workpiece. In some embodiments, the supply of the electrical current to the workpiece via the work clamp is controlled using a switch of the plasma arc processing system in electrical communication with the work clamp. The switch is configured to (i) permit the electrical current to flow through the work clamp for determining the at least one characteristic of the workpiece or (ii) prevent the supply of the electrical current to the work clamp such that the work clamp electrically grounds the workpiece. In some embodiment, the work clamp is configured to pass the electrical current to the workpiece via an intermediate conductive component.

In yet another aspect, a method is featured for controllably attaching a plasma arc generated by a plasma arc torch relative to a workpiece to mark the workpiece. The method includes generating the plasma arc by the plasma arc torch, where the plasma arc is located between an electrode and a nozzle of the plasma arc torch. The method includes electrically connecting the plasma arc to the workpiece disposed proximate to a tip of the plasma arc torch by increasing an amperage of an electrical current supplied to the torch. The method also includes dragging the plasma arc across a surface of the workpiece by translating the plasma arc torch over the workpiece. The plasma arc is adapted to contact the workpiece during the dragging such that the electrical current attaches to the workpiece to mark the workpiece. The method further includes decreasing the amperage of the electrical current to prevent the plasma arc from contacting the workpiece such that the electrical current detaches from the workpiece and reattaches to a nozzle of the plasma arc torch without marking the workpiece.

In yet another aspect, a computer-implemented plasma arc processing system is featured for controllably attaching a plasma arc to a workpiece to mark the workpiece. The system including a plasma arc torch comprising a proximal end and a distal end. The distal end of the plasma arc torch is adapted to be positioned proximate to the workpiece to process the workpiece. The system includes a power supply in electrical communication with the plasma arc torch. The power supply is configured to supply an electrical current to the plasma arc torch such that the plasma arc torch generates the plasma arc located between an electrode and a nozzle of the plasma arc torch. The electrical current has a sufficiently low amperage that the resulting plasma arc cannot cut the workpiece. The system also includes a motion device connected to the plasma arc torch. The motion device is configured to translate the plasma arc torch relative to the workpiece. The system further includes a processor in electrical communication with the motion device and the power supply. The processor is configured to perform at least one of (i) increase the amperage of the electrical current to electrically connect the plasma arc to the workpiece such that the plasma arc contacts the workpiece to mark the workpiece or (ii) decrease the amperage of the electrical current to prevent the plasma arc from contacting the workpiece such that the electrical current attaches to the nozzle of the plasma arc torch without marking the workpiece.

Any of the above aspects can include one or more of the following features. In some embodiments, the amperage of the electrical current is subsequently increased to electrically reconnect the plasma arc to the workpiece such that the electric current detaches from the nozzle and reattaches to the workpiece. In some embodiments, the electrical current is selectively increased and decreased while translating the plasma arc torch over the workpiece to mark a desired pattern on the surface of the workpiece. In some embodiments, the plasma arc torch supports the plasma arc with a non-oxidizing gas, such as Argon. In some embodiments, the amperage of the electrical current for marking the workpiece is between about 12 amps and about 25 amps.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
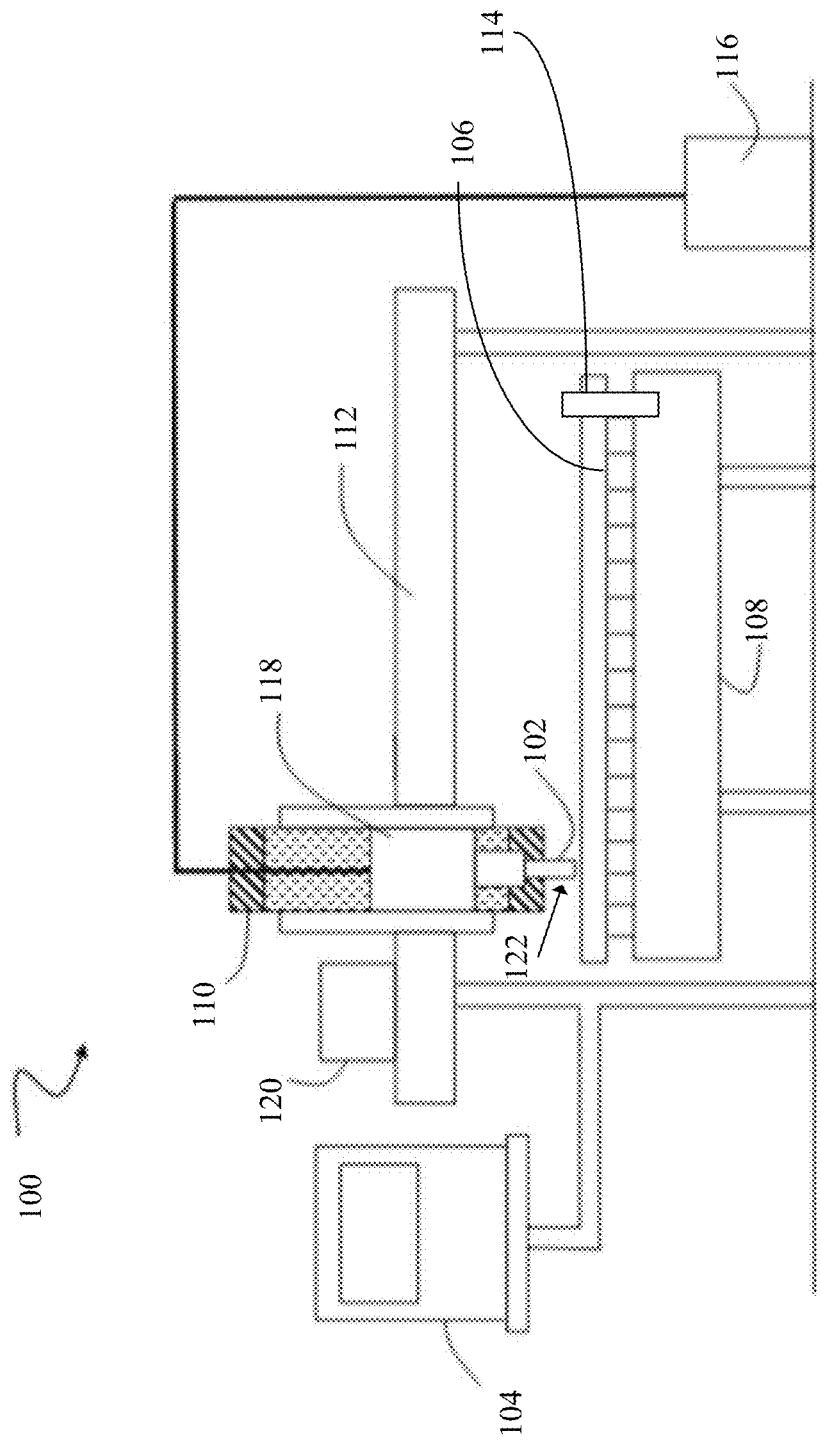
FIG. 1 shows an exemplary plasma arc processing system, according to some embodiments of the present invention.

FIG. 1 shows an exemplary plasma arc processing system 100, according to some embodiments of the present invention. As shown, the system 100 generally includes a plasma arc torch 102 in electrical communication with a processor 104, which can be a digital signal processor (DSP), microprocessor, microcontroller, computer, computer numeric controller (CNC) machine tool, programmable logic controller (PLC), application-specific integrated circuit (ASIC), or the like. The plasma arc torch 102 is configured to generate a plasma arc for processing a workpiece 106. In an exemplary arrangement of the plasma arc processing system 100 as shown in FIG. 1, the workpiece 106 is placed on a cutting table 108, and the torch 102 is mounted into a torch height controller 110, which is attached to a gantry 112. In some embodiments, a work clamp 114 is secured to the workpiece 106 and/or the cutting table 108 to provide an electrical ground for the workpiece 106 during processing. In some embodiments, an intermediate conductive component (not shown) can be positioned between the workpiece 106 and the work clamp 114 to conduct current therebetween. The processor 104 is configured to interact with various system modules of the plasma arc processing system 100 to control the relative motion between the tip of the torch 102 and the workpiece 106 while directing the plasma arc of the torch 102 along a processing path on the workpiece 106. The system 100 also includes a power supply 116 configured to interact with various system modules to control the current, voltage and/or power supplied to the torch 102 for processing the workpiece 106. In some embodiments, the processor 104 and the power supply 106 are integrated into one component. Alternatively, they are separate components as illustrated in FIG. 1.

In general, the processor 104 and/or the power supply 116 are configured to control and optimize the operation of the plasma arc torch 102 relative to the workpiece 106 by regulating many plasma system functions that include, but are not limited to, start sequence, CNC interface functions, gas and operating parameters, and shut off sequences. For example, the processor 104 and/or the power supply 116 control various system modules including (i) a gas controller 118 for controlling shield and/or plasma gases supplied to the torch 102, (ii) a driver system 120 for adjusting the lateral movement of the torch 102 in relation to the surface of the workpiece 106, (iii) the torch height controller 110 for adjusting the vertical height between the torch 100 and the workpiece 106 and (iv) nesting software (not shown) for providing a suitable cutting program that sets desired parameters for processing the workpiece 106 to achieve desired results, such as producing desired parts.

Figure 2:
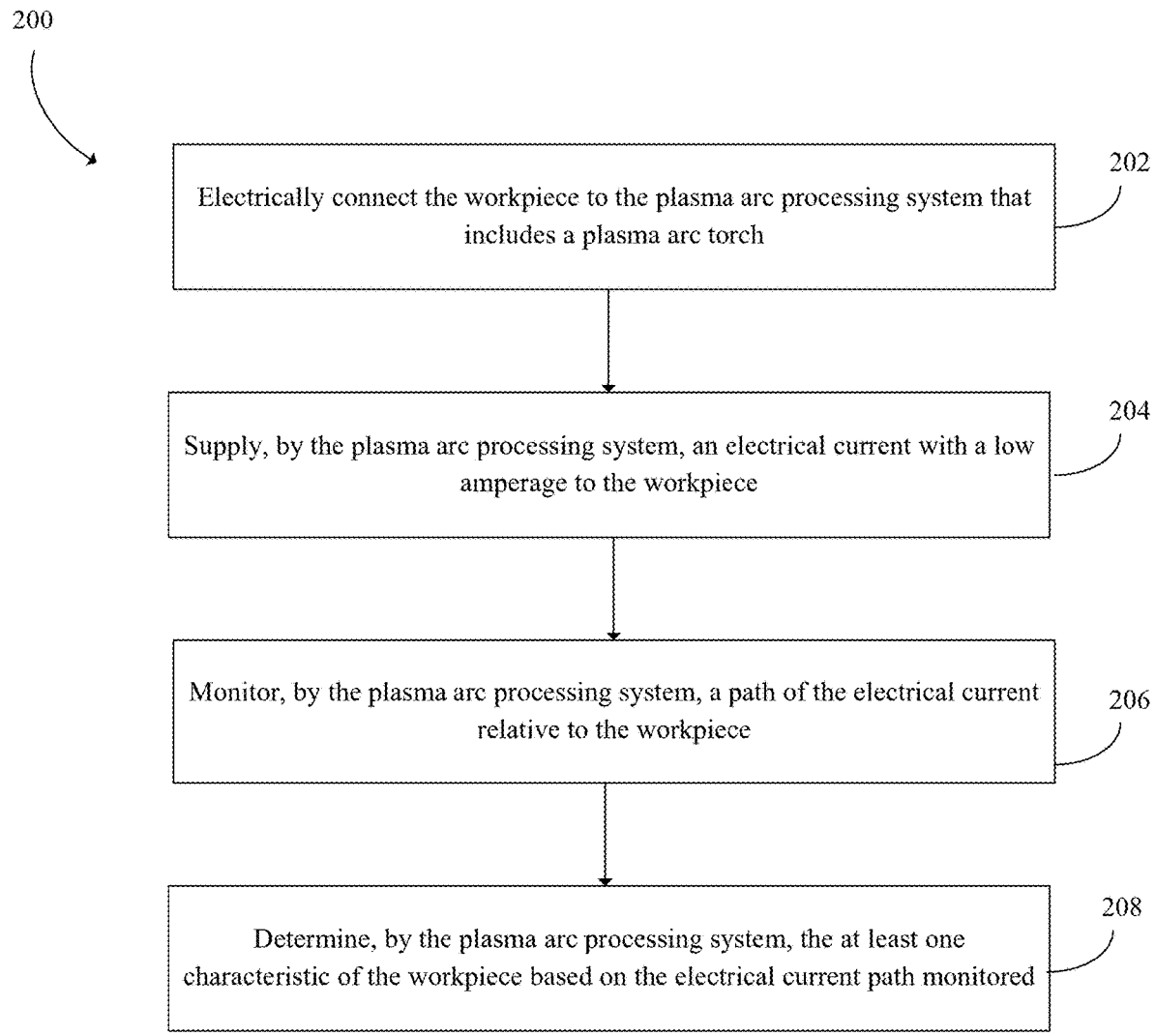
FIG. 2 shows an exemplary computerized process for automatically determining at least one characteristics of a workpiece by the plasma arc processing system of FIG. 1, according to some embodiments of the present invention.

FIG. 2 shows an exemplary computerized process 200 for automatically determining at least one characteristics of a workpiece by the plasma arc processing system 100 of FIG. 1, according to some embodiments of the present invention. The process 200 starts at step 202 with the workpiece 106 being electrically connected to the plasma arc processing system 100, such as by mounting the workpiece 106 on the cutting table 108 and positioning the distal tip 122 of the plasma arc torch 102 proximate to the workpiece 106. For example, the distal tip 122 of the plasm arc torch 102 can be positioned above a surface of the workpiece 106. In some embodiments, the work clamp 114 is used to provide an electrical ground option to the workpiece 106 during processing (e.g., sensing, cutting, or marking). At step 204, the plasma arc processing system 100 supplies a low-amperage electrical current to the workpiece 106 for the purpose of (i) monitoring a path of the electrical current relative to the workpiece at step 206, and (ii) determining at least one characteristic of the workpiece 106 at step 208 based on the electrical current path monitored. For example, monitoring the electrical current path can involve determining where the current path is relative to the workpiece 106 and/or the conductivity of the workpiece 106 after the current is supplied by the system 100. In some embodiments, the power supply 116 is configured to provide the low-amperage electrical current to the workpiece 106, where the low amperage of the electrical current is insufficient to cause the torch 102 to actually cut through the workpiece 106, but can mark the workpiece 106. In some embodiments, the low-amperage electrical current supplied can be between about 1 amp and about 20 amps. In some embodiments, the processor 104 is configured to determine the characteristic of the workpiece 106 based on the information monitored.

In one aspect, the computerized process 200 of FIG. 2 is used to automatically detect a boundary of the workpiece 106. In this application, the electrical current for the purpose of boundary detection is supplied to the workpiece 106 via the plasma arc torch 106 in the form of a plasma arc generated by the torch 102. Boundary detection is based on the theory that if the plasma arc delivered by the torch 102 impinges on the workpiece 106, the current supplied by the arc is adapted to flow through/to the workpiece 106, as detected by the power supply 116. On the other hand, if the plasma arc delivered by the torch 102 encounters open/void space (e.g., a hole in the workpiece, an edge of the workpiece, etc.), the electrical current supplied by the plasma arc is adapted to return via the nozzle of the torch 102, as detected by the power supply 116. The power supply 116 can generate an output that indicates which electrical current path is detected—via the workpiece 106 or via the nozzle of the torch 102.

In some embodiments, detection of the boundary of the workpiece 106 includes generating, by the plasma arc torch 102, a plasma arc using a low-amperage electrical current provided by the power supply 116, where the electrical current has a sufficiently low amperage such that the resulting arc cannot cut through the workpiece 106. For example, the amperage of the current supplied to the torch 102 can be lower than or equal to about 20 amps, such as about 15 amps. The amperage of the current supplied can also be higher than or equal to about 1 amp. In some embodiments, the arc is supported by a non-oxidizing plasma gas (e.g., argon or nitrogen), which can be controllably dispensed by the gas controller 118. The gantry 112, in conjunction with the height controller 110, can controllably translate the torch 102 relative to the workpiece while the low-current plasma arc is sustained and expelled by the torch 102. During translation, the plasma arc can alternate between establishing a current path through the nozzle without contacting the workpiece 106 (indicating an absence of workpiece material beneath the torch 102) and a current path through the workpiece (indicating detection of workpiece material beneath the torch 102). For example, as the torch 102 moves from a void region to a material region of the workpiece 106, the current path from the plasma arc changes from the nozzle to the workpiece, i.e. the plasma arc begins to transfer to the workpiece 106. The void region can be a region beyond the outer boundary of the workpiece 106 or a cutout area within the outer boundary of the workpiece 106. Once the arc transfers, rather than initiating ramp up and cutting, the torch 102 continues to translate and sustain the low-current arc until the torch 102 moves off of the workpiece 106, at which point the current return path changes from the workpiece 106 to the nozzle of the torch 102. The location of these current path changes/variations thus indicates edges of the workpiece. In general, the processor 104 and/or the power supply 116 can monitor the electrical current paths as the torch 102 translates relative to the workpiece 106, including monitoring the locations at which the current path changes from the workpiece to the torch nozzle and vice versa. These changes/variations in the current paths over time during the translation of the torch 102 can be used by the processor 104 to map the boundary(s) and/or holes of the workpiece.

In some embodiments, during a boundary determination process, the processor 104 controls the translation movement of the plasma arc torch 102 relative to the workpiece 106 such that the torch 102 translates no more than a predefined distance into the void region before changing direction to return to the workpiece material region. This distance can be absolute, such as about 1 inch, for example. This distance can be relative, such as a percentage of the torch-to-workpiece distance (e.g., about 0.25 inches). In general the distance for the torch 102 to travel beyond a workpiece edge before changing direction depends on the torch height, current, gas type and/or translation speed. In some embodiments, the plasma arc torch 102 can be manipulated to travel in a substantially stepwise or serpentine path relative an anticipated edge of the workpiece 106 to perform boundary mapping (e.g., precision boundary mapping). In some embodiments, the torch 102 is translated laterally relatively to the workpiece 106 without changing its height relative to the workpiece 106. In some embodiments, the plasma arc delivered to the workpiece 106 for the purpose of boundary detection is not sufficiently high to cut the workpiece 106, but can mark the workpiece 106. In some embodiments, the low-amperage current supplied by the system 100 for the purpose of boundary detection is relatively constant (e.g., at about 15 amps). In some embodiments, the motion output of the gantry 112 and/or the power supply 116 is activated (e.g., set to ON) when the plasma arc is initiated for the purpose of workpiece boundary detection.

Figure 3:
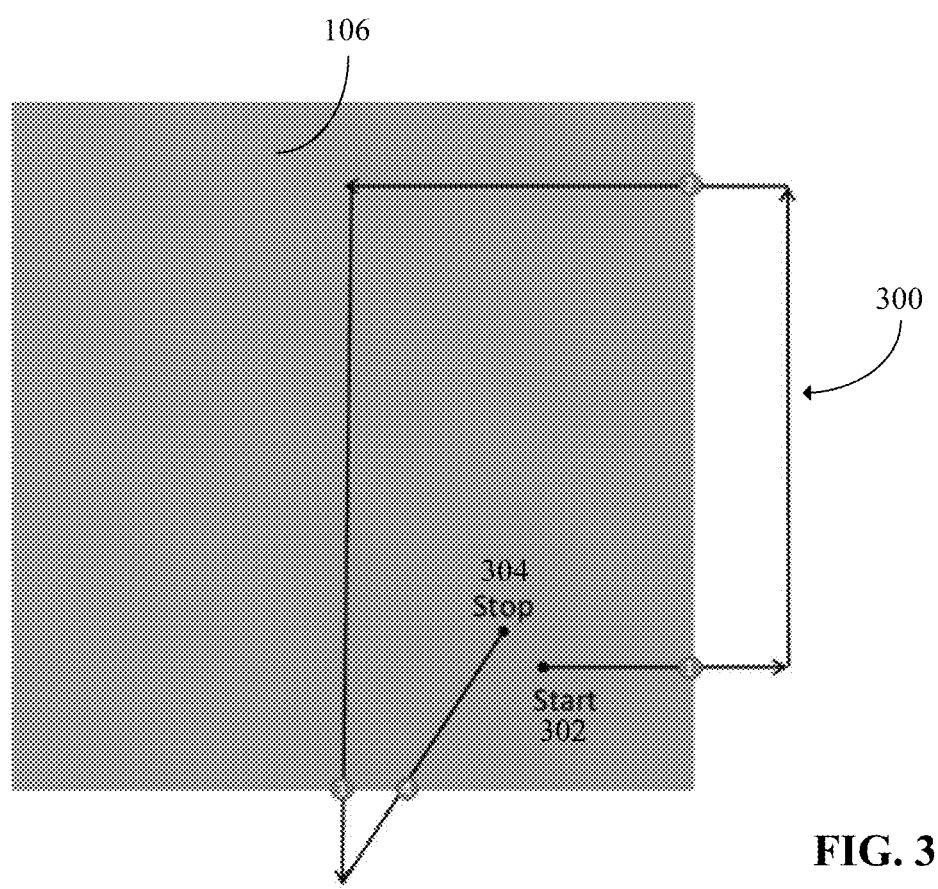
FIG. 3 shows an exemplary motion profile of the plasma arc torch of the plasma processing system of FIG. 1 for traversing a workpiece 106 to detect the boundary of the workpiece, according to some embodiments of the present invention.
Figure 4:
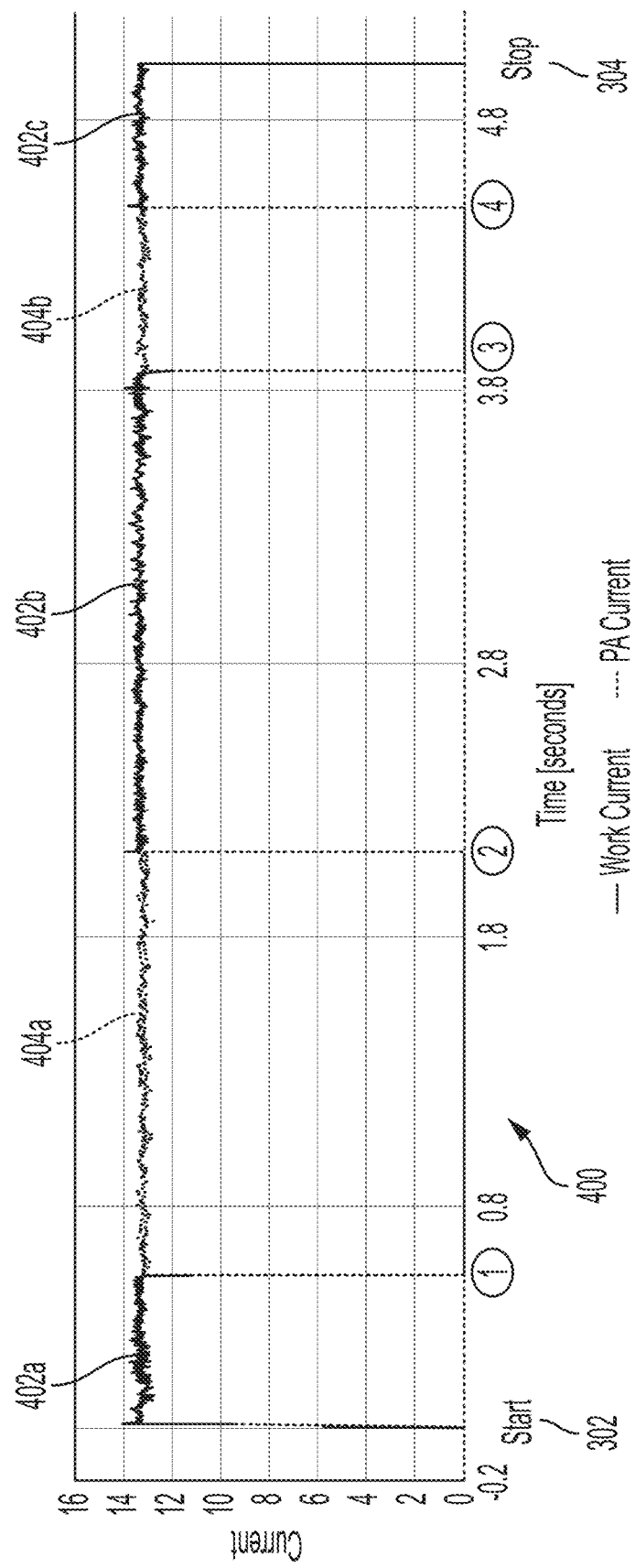
FIG. 4 shows an exemplary current trace diagram corresponding to the motion profile of the plasma arc torch of FIG. 3, according to some embodiments of the present invention.

FIG. 3 shows an exemplary motion profile 300 of the plasma arc torch 102 of the plasma processing system 100 of FIG. 1 for traversing a workpiece 106 to detect the boundary of the workpiece 106, according to some embodiments of the present invention. The system 100 operates by first causing the plasma arc torch 100 to generate a plasma arc. Then, the system 100 begins to translate the torch 100 relative to the workpiece 106 as soon as the electrical current delivered by the plasma arc is detected, which is either through the nozzle of the torch 102 (piloting) or the workpiece 106 (transferred arc). For the motion profile 300 of FIG. 3, the path of the torch 102 transitions on and off of the workpiece 106 four times, as indicated by the numbered transitions in FIG. 3 from the start 302 of the profile 300 to the end 304 of the profile 300. FIG. 4 shows an exemplary current trace diagram 400 corresponding to the motion profile 300 of the plasma arc torch 102 of FIG. 3, according to some embodiments of the present invention. The four numbered locations in the current trace diagram 400 corresponding to the respective ones of the numbered transitions in FIG. 3. More specifically, diagram 400 shows two current curves over time, where curve 402 (including segments 402a, b and c) illustrates the amount of current measured through the workpiece 106 over time, and curve 404 (including segments 404a and b) illustrates the amount of current measured through the nozzle of the torch 102 over time. The current path switching between the workpiece 106 and the nozzle of the torch 102 that occurs at the four numbered locations on diagram 400 corresponds to the four numbered edge transitions in the motion profile 300.

In particular, as shown in FIGS. 3 and 4, when the torch 102 starts translation at starting point 302 of the motion profile 300 and moves from the workpiece 106 to the surrounding void region at transition 1, the current on the trace diagram 400 changes from transferring to the workpiece 106 (current curve 402a) to returning through the nozzle (current curve 404a) around the time corresponding to transition 1. In addition, a voltage trace (not shown) is adapted to indicate a voltage transfer from workpiece 106 to the nozzle of the torch 102 around the moment the torch 102 moves off of the workpiece 106 and into the void. During this transition, some current may be flowing both to the torch nozzle and to the workpiece 106. Thereafter, when the torch 102 moves from the void region back to the workpiece 106 at transition 2 in the motion profile 300, the current on the trace diagram 400 changes from returning through the nozzle (current curve 404a) to transferring to the workpiece 106 (current curve 402b) around the time corresponding to transition 2. Thereafter, when the torch 102 moves from the workpiece 106 to the surrounding void region at transition 3 in the motion profile 300, the current on the trace diagram 400 changes from transferring to the workpiece 106 (current curve 402b) to returning through the nozzle (current curve 404b) around the time corresponding to transition 3. Finally, when the torch 102 moves from the void region back to the workpiece 106 at transition 4 in the motion profile 300 before finishing at end point 304, the current on the trace diagram 400 changes from returning through the nozzle (current curve 404b) to transferring to the workpiece 106 (current curve 402c) around the time corresponding to transition 4. Therefore, the motion of the torch 102 from the start point 302 to the end point 304 of the motion profile 300 allows the plasma arc processing system 100 to determine and map (via the known position of the torch 102 on the gantry 112 during motion) several points along the perimeter of the workpiece 106 based on the current paths 402, 404 monitored during the motion profile 300.

In some embodiments, the plasma arc torch 102 is translated at a speed of about 400 inches per minute or about 0.007 inches' per millisecond. At this speed, high resolution (e.g., 1 kHz) sampling of the current path transitions can be achieved to capture changes in current path that occur over about 2 to about 3 milliseconds. In some embodiments, these settings are able to provide an accuracy in the detected workpiece edge of about 0.014 inches to about 0.021 inches.

Figure 5A:
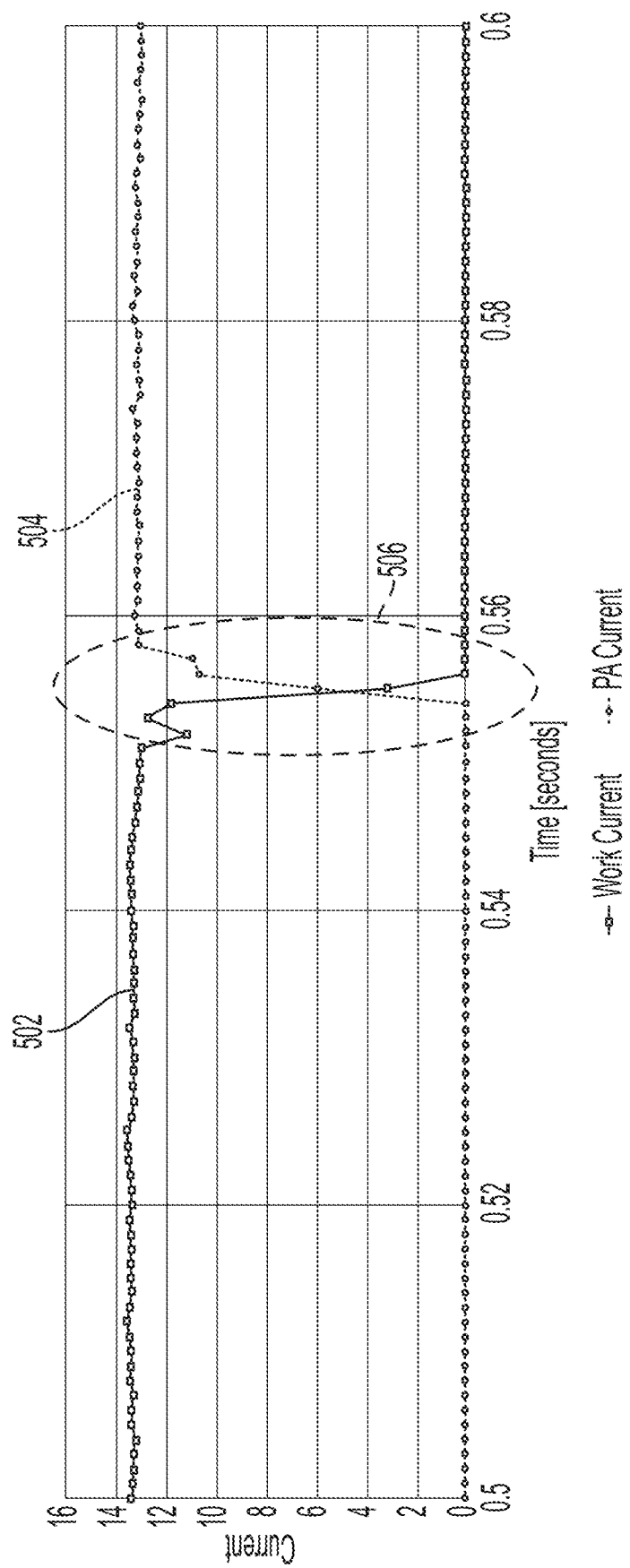
FIGS. 5a and 5b show two exemplary current path transitions captured by the plasma arc system of FIG. 1, according to some embodiments of the present invention.
Figure 5B:
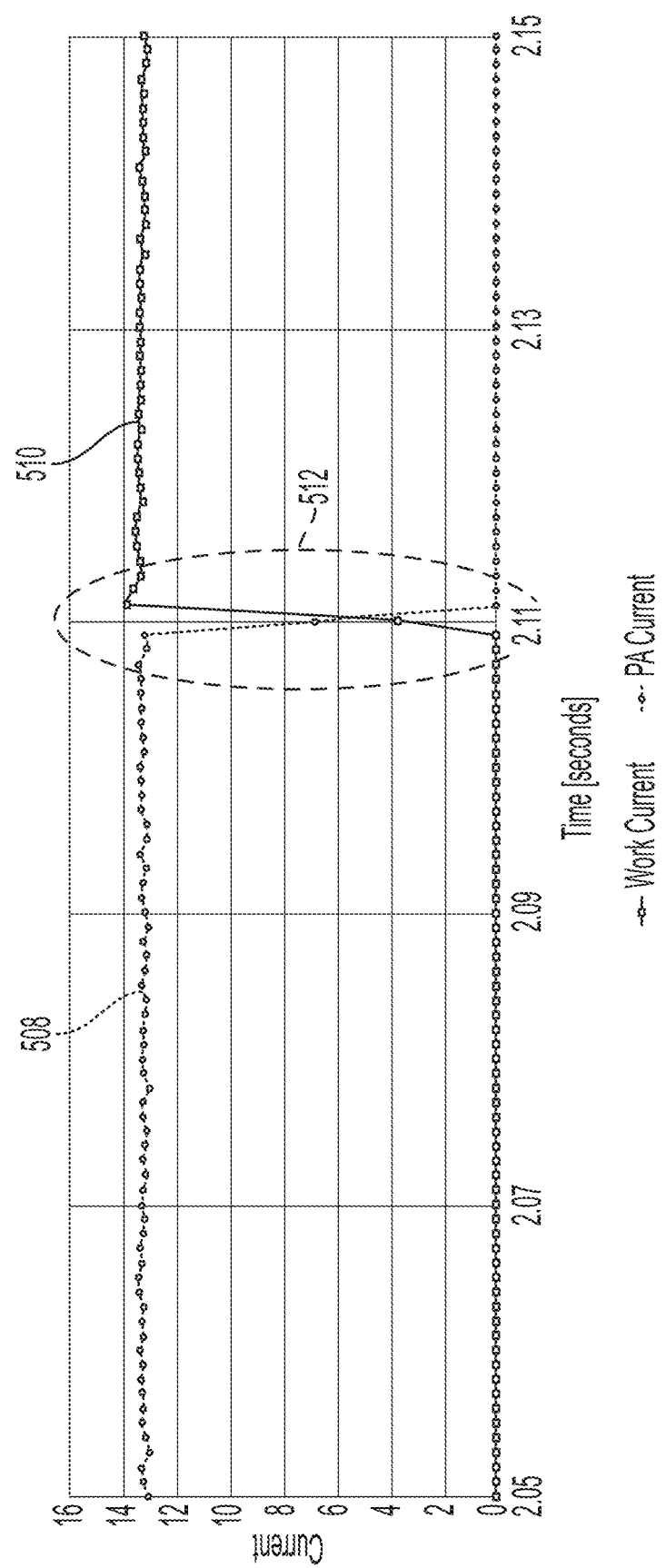

FIGS. 5a and 5b show two exemplary current path transitions captured by the plasma arc system 100 of FIG. 1, according to some embodiments of the present invention. FIG. 5a shows two current curves over time, where current curve 502 illustrates the amount of current measured through the workpiece 106 over time, and curve 504 illustrates the amount of current measured through the nozzle of the torch 102 over time. These two curves 502, 504 can be used to detect the occurrence of a plasma arc transition 506 from the workpiece to the void region, during which the workpiece current curve 502 ramps down from its steadstate value to about zero (indicating no current goes to workpiece 106 while torch is over void) while the nozzle current curve 504 ramps up from zero to its steady-state value (indicating that the plasma arc rescinds into the torch 102 when no workpiece 102 is beneath the torch 102). FIG. 5b shows two current curves over time, where current curve 508 illustrates the amount of current measured through the nozzle of the torch 102 over time, and curve 510 illustrates the amount of current measured through the workpiece 106 over time. These two curves 508, 510 can be used to detect the occurrence of a plasma arc transition 512 from the void region to the workpiece, during which the nozzle current curve 508 ramps down from its steady-state value to about zero while the workpiece current curve 510 ramps up from zero to its steady-state value.

Figure 6:
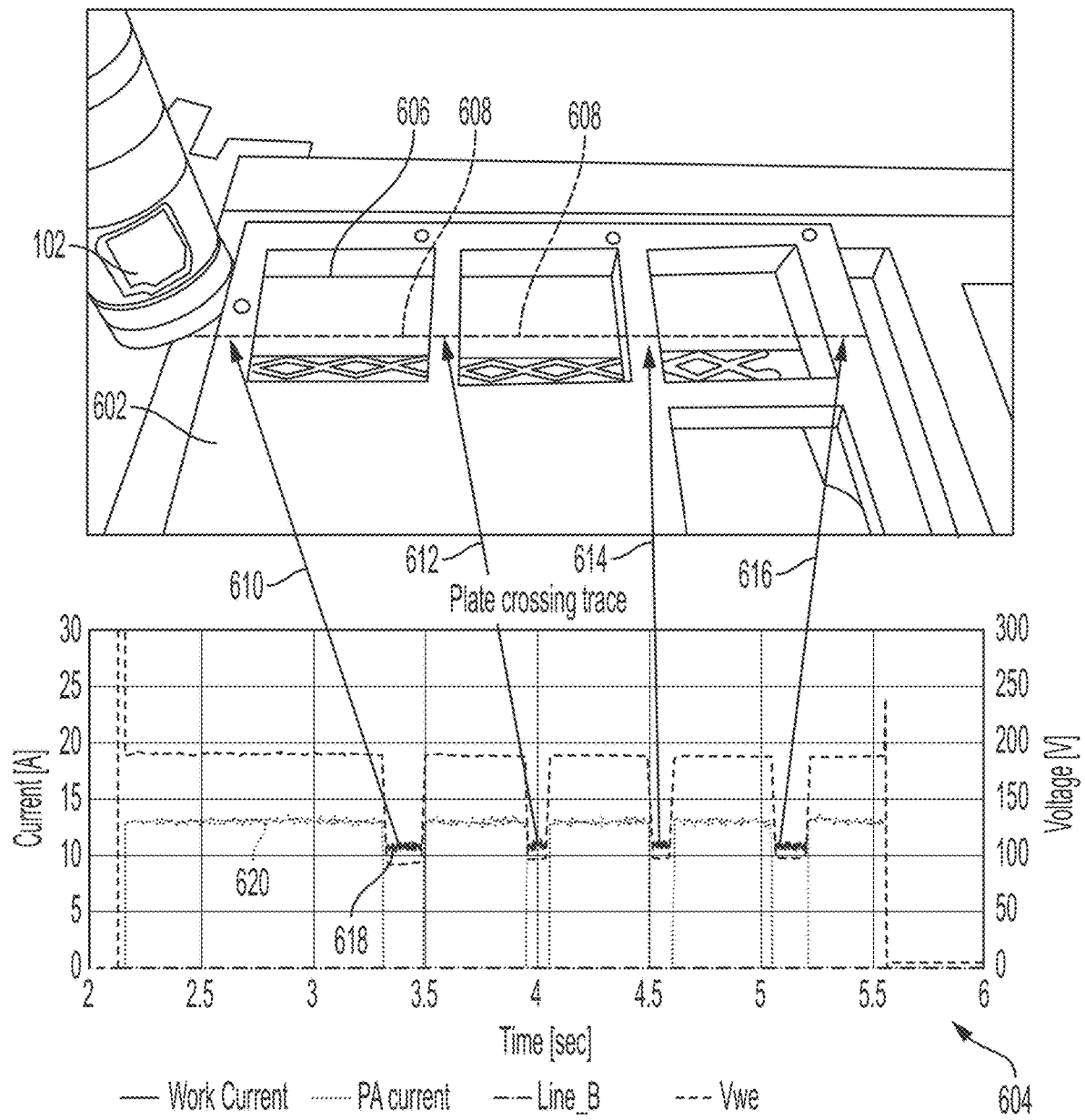
FIG. 6 shows an exemplary irregular workpiece with a corresponding current trace diagram illustrating how the plasma arc torch system of FIG. 1 can be used to detect and/or process edges of the irregular workpiece, according to some embodiments of the present invention.

FIG. 6 shows an exemplary irregular workpiece 602 with a corresponding current trace diagram 604 illustrating how the plasma arc torch system 100 of FIG. 1 can be used to detect and/or process edges of the irregular workpiece 602, according to some embodiments of the present invention. As shown, the workpiece 602 includes several rectangular cutout/void regions 606. During edge detection, the processor 104 can cause the plasma arc torch 102 to travel in a straight line path 608 relative to the workpiece 602, along which the torch 102 is adapted to traverse through the rectangular cutout regions 606. The corresponding current trace diagram 604 shows two current curves, including (i) a workpiece current curve 618 that illustrates the current detected in the workpiece 602 over time as the torch 102 travels along the path 608 and (ii) a nozzle current curve 620 (e.g., pilot arc current) that illustrates the current detected in the nozzle of the torch 102 over time as the torch 102 travels along the path 608.

Specifically, when the torch 102 is over each of the thin ribbed workpiece regions along the path 608 (shown by arrows 610, 612, 614, 616), the workpiece current curve 618 illustrates that the current detected in the workpiece 602 is elevated while the nozzle current curve 620 illustrates that the current detected in the torch nozzle is about zero. The two current curves 618, 620 at these durations thus indicate that the plasma arc from the torch 102 is attaching to the workpiece 602 and not a void region (e.g., a cutout region 606). Conversely, when the torch 102 is over each of the cutout regions 606 along the path 608, the workpiece current curve 618 shows that the current through the workpiece 602 is about zero while the nozzle current curve 620 shows that the current through the torch nozzle is elevated. The two current curves 618, 620 at these durations thus indicate that the plasma arc from the torch 102 is impinging in a void region (e.g., a cutout region 606) by attaching to the torch nozzle and not on the workpiece 602. Therefore, based on the information provided by the workpiece 602 and the current trace diagram 604, the plasma arc processing system 100 is able to automatically determine the boundary, shape, voids, limits, etc. of the irregular workpiece 602, including the edges of the rectangular cutout regions 606 in the workpiece 602. The system 100 can also generate a program to perform a desired processing operation on the workpiece 602 based on the boundary determined.

Figure 7:
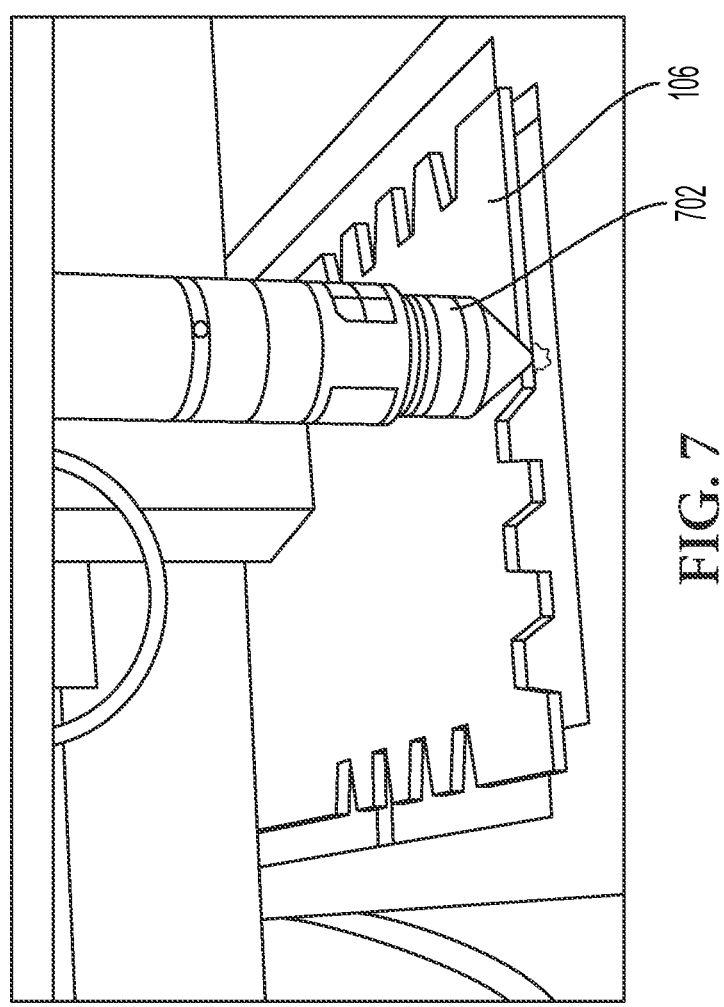
FIG. 7 shows an exemplary liquid-cooled plasma arc torch configured for installation in the plasma arc processing system of FIG. 1, according to some embodiments of the present invention.

In some embodiments, the plasma arc processing system 100 is able to perform material processing (e.g., cutting) at an edge of a workpiece 106 after, for example, the edge of the workpiece 106 is determined using the boundary detection approach described above. In some embodiments, between two consecutive material processing operations (e.g., two cuts), a substantially continuous/extended low-current plasma arc is maintained by the plasma arc torch 102. This extended arc operation in the liquid cooled system 100 is in part enabled by at least one of the use of an inert gas along with fast gas (via gas controller 118 which is located proximate torch 102) and current control provided by the plasma arc processing system 100. This fast gas and current control enable responsive reactions to arc transitions, thereby allowing the system 100 to keep the arc stable via quick switches between different kinds of gases (e.g., between reactive and inert) and current control adjustments. FIG. 7 shows an exemplary liquid cooled plasma arc torch 702 configured for installation in the plasma arc processing system 100 of FIG. 1 for performing a series of distinct cuts with a continuous low-current plasma arc maintained between the cuts, according to some embodiments of the present invention. As shown in FIG. 7, the torch 702 is able to cut along an edge of the workpiece 106 in a step-wise fashion. In alternative embodiments, the plasma arc torch is air-cooled to support an extend-arc operation.

Figure 8:
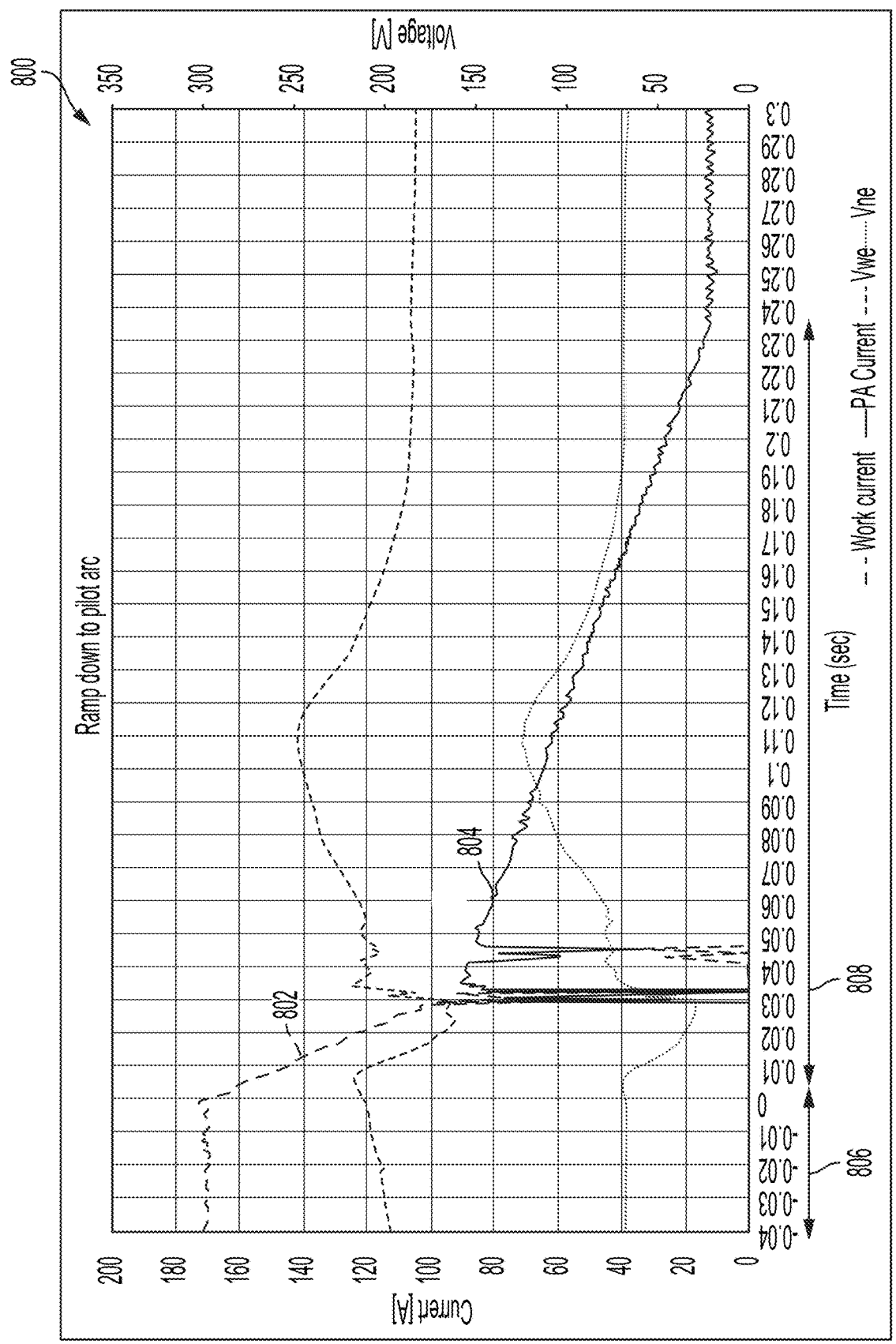
FIG. 8 shows an exemplary current trace diagram illustrating various signals monitored by the plasma arc torch system of FIG. 1 as the plasma arc torch of FIG. 7 makes a single cut over an edge of a workpiece using an extended arc technique, according to some embodiments of the present invention.

FIG. 8 shows an exemplary current trace diagram 800 illustrating various signals monitored by the plasma arc torch system 100 of FIG. 1 as the plasma arc torch 702 of FIG. 7 makes a single cut over an edge of a workpiece using an extended arc technique, according to some embodiments of the present invention. The cutting path requires the torch 702 to transition from cutting the workpiece to moving to a void region beyond an edge of the workpiece 106. The current trace diagram 800 includes two current curves 802 and 804, where the workpiece current curve 802 represents the amount of current detected in the workpiece 106 over time and the nozzle current curve 804 represents the amount of current detected in the nozzle of the torch 102 over time.

As shown in FIG. 8, for a cutting operation over duration 806, a high amperage electrical current (e.g., about 170 amps) is used by the torch 102 to generate a plasma arc that is sufficiently powerful to transfer to and cut the workpiece 106. Therefore, the workpiece current curve 802 is relatively high (e.g., at about 170 amps) over duration 806, while the nozzle current curve 804 is about zero. As the torch 102 translates along the cut, the torch can move over an edge of the workpiece 106 and into a void region beyond the workpiece 106. When the system 100 detects that the electrical current of the plasma arc used for cutting is beginning to transition and attach back to the nozzle of the torch 102 instead of to the workpiece 106, it indicates that the torch 102 is positioned in a void region beyond the workpiece 106, at which point the system 100 can ramp down the current supplied to the torch 102 (e.g., to about 15 amps) such that a low-current arc is maintained over the void region via the torch nozzle. The low current is adapted to return through the nozzle of the torch 102 as the torch 102 moves through the void region. This is illustrated in the current trace diagram 800, where during the ramp down period 808, the workpiece current curve 802 is reduced to zero while the nozzle current curve 804 is increased to a level that is much lower than the current used for the cutting operation 806 (e.g., about 15 amps). This low-current arc is maintained by the torch 102 until the system 100 again detects that the plasma arc impinges on the workpiece 106 and the current is transferred to the workpiece 106, in which case the system 100 commences the cutting operation by ramping up the current supplied to the torch 102 (not shown in FIG. 8). In general, as the torch 102 transitions from the workpiece to the void region and back to the workpiece again, the arc is not extinguished and can be ramped up and down depending on where the arc attaches. In some embodiments, during torch transition between the workpiece 106 and the void region, current can be transferred to both the workpiece 106 and the torch nozzle for a short duration of time (e.g., about 0.03 seconds), during which both the workpiece current curve 802 and the nozzle current curve 804 are above zero.

In contrast, for traditional plasma arc processing systems, an arc is extinguished (instead of dialed down) once the system detects that the arc is stretched over a void region. Such an abrupt ramp down from high-current processing (and subsequent abrupt ramp up to perform another cut) can damage torch consumables and shorten their usable life. Thus, the ability of the plasma arc processing system 100 of the present invention to maintain an arc between two cuts protects torch consumables. In some embodiments, the system 100 is configured to maintain a low-current plasma arc for a predefined time period (e.g., about 5 seconds) before extinguishing the arc and/or alert the operator of a possible error. This duration gives the torch sufficient time to return to the workpiece to resume the cut operation. In some embodiments, this duration provides the system 100 with sufficient time to stabilize the plasma arc on the workpiece 106 before ramping up the current to a cutting current level to cut the workpiece. In some embodiments, the low-current plasma arc delivers an electrical current of about 15 amps in a non-oxidizing gas such as argon, where the use of argon gas by the plasma arc torch facilitates the generation of a stable arc. In some embodiments, argon gas is also used for the material processing operations (e.g., cutting operations), including for arc ramp up and ramp down sequences. In some embodiments, the processor 104 in connection with the gas controller 118 is able to rapidly change the gas pressure and/or gas type supplied to the torch 102 in order to rapidly transition from processing a workpiece (i.e., when the plasma arc attaches to the workpiece) to traversing through a void region (i.e., when the plasma arc attaches to the nozzle) and vice versa.

Figure 9:
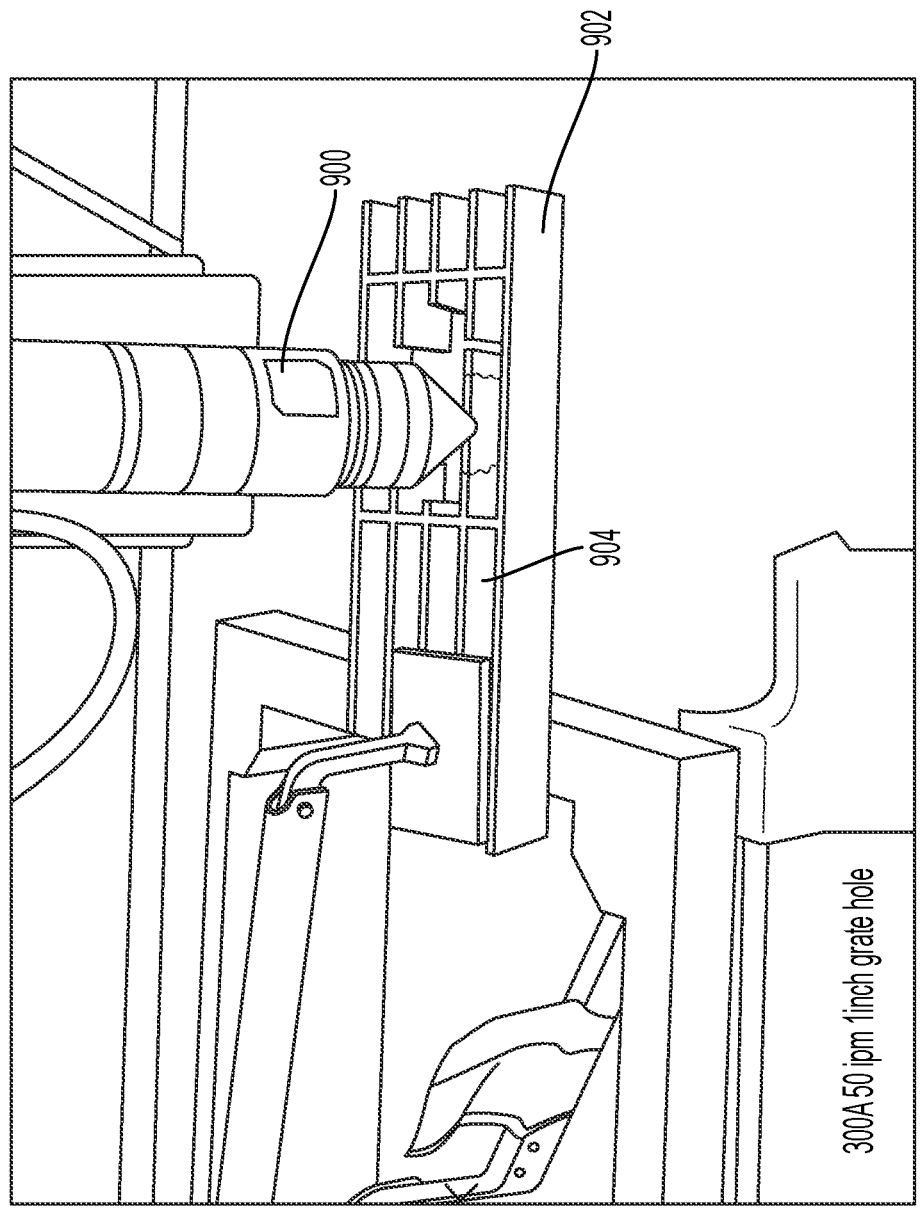
FIG. 9 shows an exemplary liquid-cooled plasma arc torch employing a rapid re-firing technique to cut a significantly irregular workpiece, according to some embodiments of the present invention.

In some embodiments, instead of maintaining an extend arc over a void region between two consecutive material processing operations (e.g., two cuts), the plasma arc processing system 100 can cause the torch to extinguish the plasma arc and rapidly re-fire the plasma arc within a specific time period after the arc is extinguished, thereby foregoing the transition period from transferred arc to pilot arc. FIG. 9 shows an exemplary liquid-cooled plasma arc torch 900 employing a rapid re-firing technique to cut a significantly interrupted/irregular workpiece 902, according to some embodiments of the present invention. As shown, the workpiece 902 has a slated area 904 (i.e., a grate) defined by multiple interior void areas segmented by multiple thin slats of various lengths.

Figure 10:
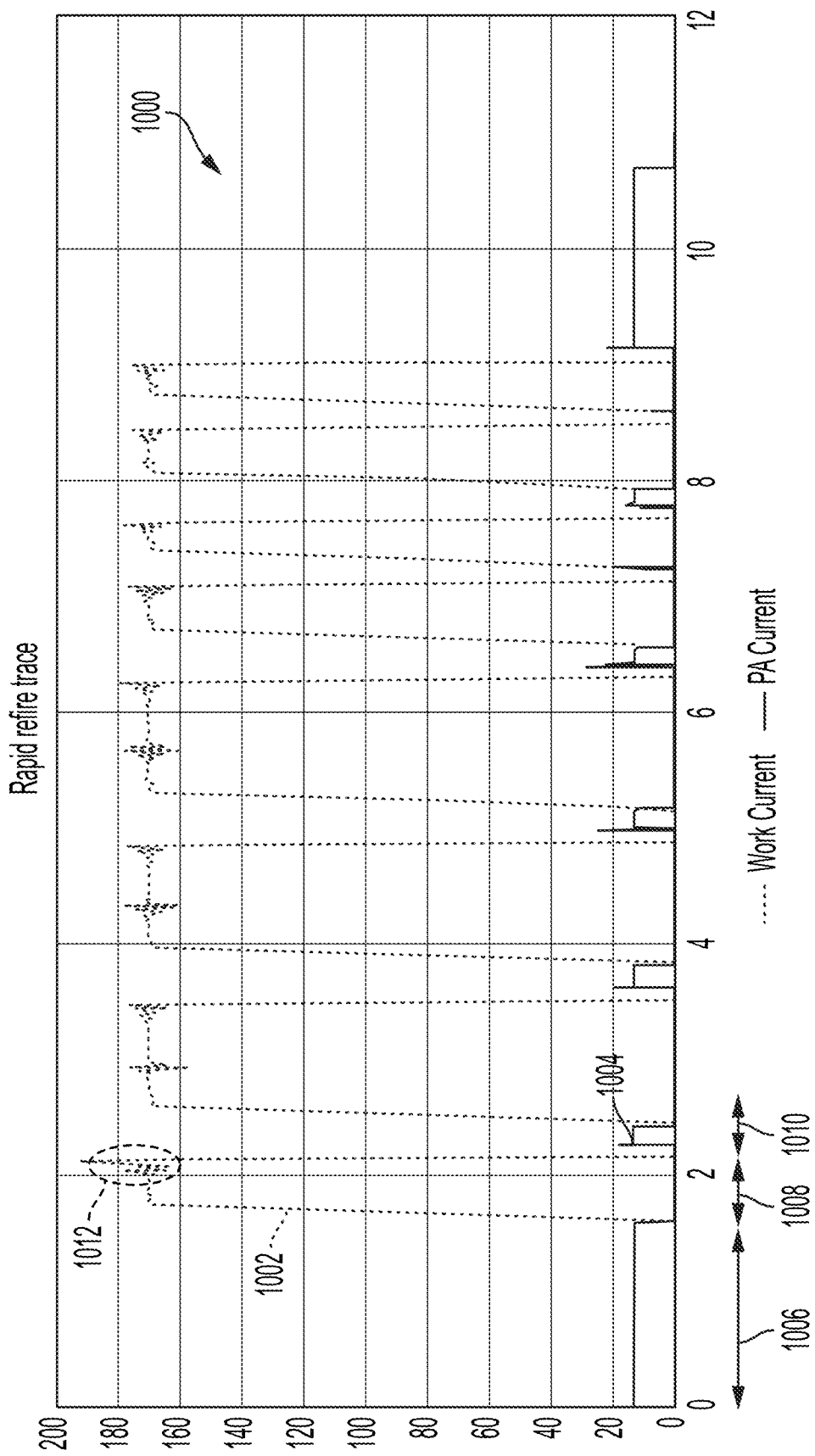
FIG. 10 shows an exemplary current trace diagram illustrating various signals monitored by the plasma arc system of FIG. 1 as the plasma arc torch of FIG. 9 cuts across the workpiece of FIG. 9, according to some embodiments of the present invention.

FIG. 10 shows an exemplary current trace diagram 1000 illustrating various signals monitored by the plasma arc system 100 of FIG. 1 as the plasma arc torch 900 of FIG. 9 cuts across the slated area 904 of the workpiece 902 of FIG. 9, according to some embodiments of the present invention. The trace diagram 1000 includes a workpiece current curve 1002 representing the amount of current detected in the workpiece 902 over time and a nozzle current curve 1004 representing the amount of current detected in the nozzle of the torch 900 over time.

As shown, the torch 900 is initially positioned over a void region of the workpiece 902 at duration 1006, in which case a low current arc is generated and attached to the nozzle of the torch 900 (piloting). This is reflected by the substantially constant nozzle current curve 1004 (at about 15 amps) over duration 1006, while the workpiece current curve 1002 is nearly zero over the same duration 1006. As the torch 900 translates and traverses over a slat of the workpiece 902, the plasma arc generated by the torch 900 transfers to the slat. The system 100 can rapidly ramp up the current (e.g., to about 170 amps) supplied to the torch 900 to generate a sufficiently powerful plasma arc to cut the slat. This is reflected by the elevated workpiece current curve 1002 (at about 170 amps) over duration 1008 and substantially zero nozzle current curve 1004 over the same duration 1008. As the torch 900 cuts through the slat and transitions to a void region of the slated area 904, the workpiece current curve 1002 shows that the plasma arc is beginning to stretch and becoming unstable (e.g., indicated by the noise in the workpiece current curve 1002 shown toward the end of the cut in region 1012). This is detected by the plasma arc system 100 which then completely extinguishes the arc (e.g., via a controlled ramp down) that is reflected by both the workpiece current 1002 and nozzle current 1004 being about zero at the beginning of duration 1010. The system 100 then re-fires/restarts the plasma arc in argon at a lower-amperage current of about 15 amps while the torch 102 travels through the void region, as reflected by the elevated nozzle current curve 1004 at about 15 amps (and nearly zero workpiece current curve 1002) over the latter part of duration 1010. This restart immediately prepares the torch 900 to cut the next slat. Once the system 100 detects that the arc is attached to the workpiece 902 again, which means that the next slat in the slated region 904 of the workpiece 902 is encountered, the system 100 can ramp up the current delivered to the torch 902 to commence the cutting operation. This process can be repeated until the desired processing is completed, including all the slats in the slated region 904 are cut. Specifically, as shown in FIG. 10, the torch 900 can make a series of eight cuts, which correspond to eight slats of various lengths in the slated region 904. In some embodiments, the processor 102 of the plasma arc processing system 100 is adapted to perform the cutting of the series of slats with a single start/stop signal and without issuing any error signals. In contrast, in a traditional cutting approach, the processor 102 is adapted to treat the cutting of each slat as a separate start/stop event and generate an error signal for each one.

Figure 11:
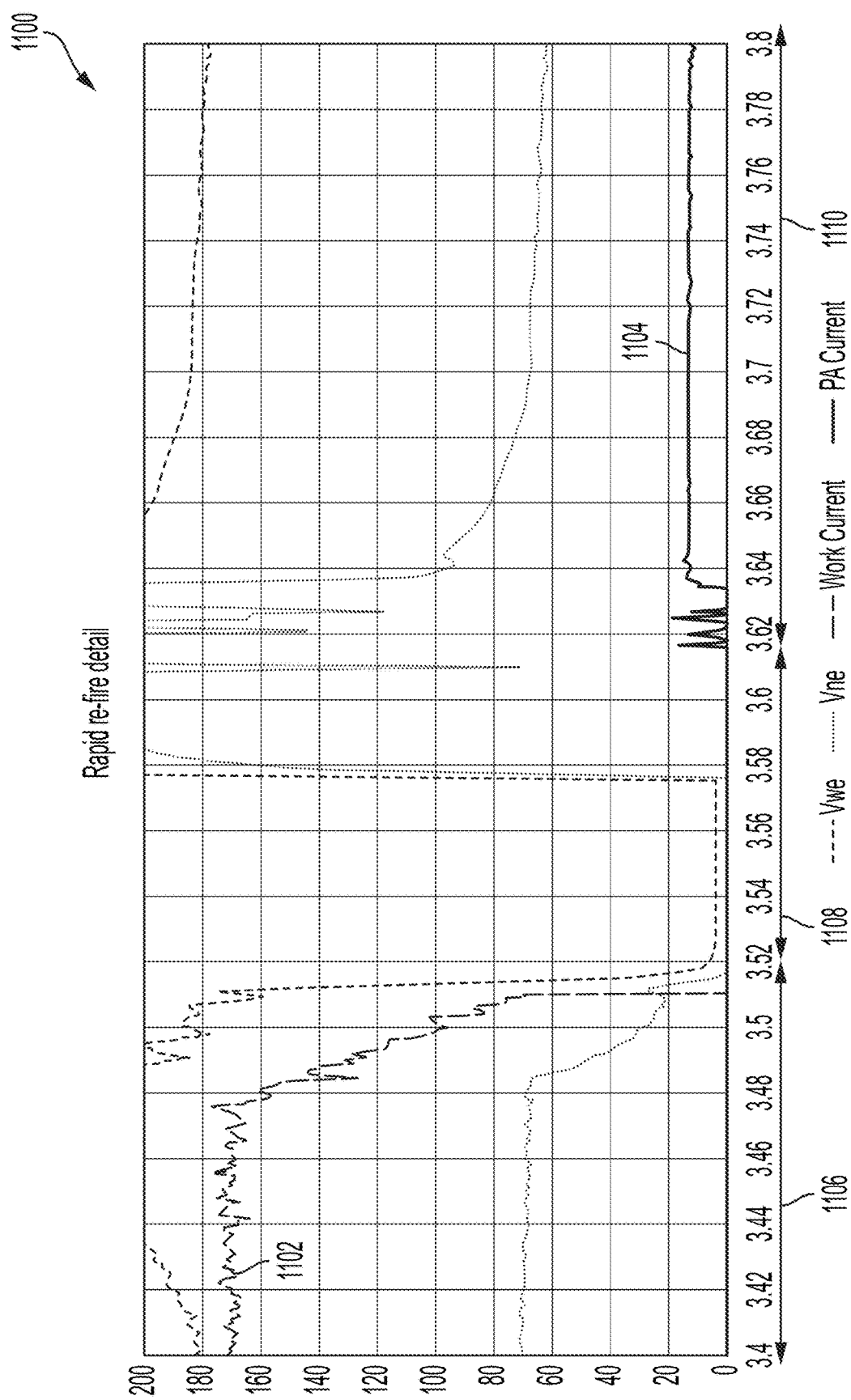
FIG. 11 shows an exemplary current trace diagram illustrating various signals monitored by the plasma arc torch system of FIG. 1 as a plasma arc torch makes a single cut over an edge of a workpiece using the rapid re-fire technique described above with reference to FIGS. 9 and 10, according to some embodiments of the present invention.

FIG. 11 shows an exemplary current trace diagram 1100 illustrating various signals monitored by the plasma arc torch system 100 of FIG. 1 as a plasma arc torch 100 makes a single cut over an edge of a workpiece 106 using the rapid re-fire technique described above with reference to FIGS. 9 and 10, according to some embodiments of the present invention. The cutting path requires the torch 100 to transition from cutting the workpiece 106 to moving to a void region beyond an edge of the workpiece 106. The current trace diagram 1100 includes two current curves 1102 and 1104, where the workpiece current curve 1102 represents the amount of current detected in the workpiece 106 over time and the nozzle current curve 1104 represents the amount of current detected in the nozzle of the torch 102 over time.

As shown in FIG. 11, for a cutting operation over duration 1106, a high-amperage electrical current (e.g., about 170 amps) is used by the torch 102 to generate a plasma arc that is sufficiently powerful to transfer to and cut the workpiece 106. Therefore, the workpiece current curve 1102 is relatively high (e.g., at about 170 amps) over duration 1106, while the nozzle current curve 1104 is about zero. As the torch 102 translates along the cut, the torch can move over an edge of the workpiece 106 and into a void region outside of the workpiece 106. When the system 100 detects that the electrical current of the plasma arc used for cutting becomes unstable, which indicates that the torch 102 is transitioning into a void region beyond the workpiece 106, the system 100 can extinguish the plasma arc for a predefined duration 1108. Therefore, both the workpiece current curve 1102 nozzle current curve 1104 are about zero over duration 1108 (e.g., about 110 milliseconds). Thereafter, the torch 102 can re-fire the plasma arc at a low current (e.g., about 15 amps) and the resulting arc attaches to the nozzle of the torch 102 if the torch remains in the void region. This is reflected by the nozzle current curve 1104 being elevated over duration 1110 (e.g., at 15 amps) while the workpiece current curve 1102 remains zero over the same duration.

In some embodiments, re-firing of the plasma arc while the torch travels over a void region does not depend on interaction with the processor 104 and/or the power supply 116, as the torch 102 can be configured to automatically re-fire in a predefined period of time (e.g., in about 110 milliseconds) after the arc is extinguished. In some embodiments, the predefined time period for re-firing a plasma arc is dictated by gas system volumes, response time and/or torch translation speed. In some embodiments, the torch 102 is configured to travel at a relative low speed of about 50 inches-per-minute to about 100 inches-per-minute to ensure that the distance travelled by the torch between when the plasma arc is ramped down for extinguishment and when it is re-fired is sufficiently small that all the workpiece material is cut. For example, with a 110 millisecond predefined re-fire period of time, if the torch 102 extinguishes the plasma arc and is over the workpiece again within 20 milliseconds, the torch 102 is adapted to travel at least about 90 milliseconds worth of distance before re-firing and beginning to cut, which can result in a portion of the workpiece being uncut. Lower torch speeds minimize such a risk. In general, the re-firing technique described above with reference to FIGS. 9-11 allows for quick and consistent cutting of workpieces, especially significantly interrupted/irregular workpieces, such as the workpiece 902 of FIG. 9.

In another aspect, the computerized process 200 of FIG. 2 is used to automatically mark a workpiece 106 in a desired pattern by controlling the timing and/or the intensity of the plasma arc delivered to the workpiece by the plasma arc torch 100. In this application, the system 100 is configured to modulate the electrical current supplied to the plasma arc torch 100 to generate the plasma arc for the purpose of marking the workpiece 106. Specifically, this marking application is based on the theory that if marking is desired, the system 100 can supply and/or increase a current value to the torch 100 that is sufficiently high to mark the workpiece without cutting the workpiece. In this case, the plasma arc (along with the electrical current) is transferred to the workpiece to accomplish the marking operation. On the other hand, if no marking is desired (e.g., paused between two marks), the system 100 can lower the current (without entirely shutting off the current) to the torch 100 such that the arc returns through the nozzle of the torch 102 without being attached to the workpiece 106. In some embodiments, by selectively modulating the current supplied to the plasma arc torch, the system 100 can determine a threshold electrical current at or above which the current path travels through the workpiece 106 to mark the workpiece 106 and below which the current travels through the torch nozzle without marking the workpiece 106, thereby effectively controlling/manipulating the path of the current (e.g., workpiece or nozzle) by controlling the current value of the arc itself. This threshold current can be about 5 amps, for example. In some embodiments, the current used to mark a workpiece can be between about 12 amps and about 25 amps. The marking current is generally dependent on a number of factors including the marking gas type and nozzle geometry. In some embodiments, the current used to maintain the plasma arc in between two marks does not decrease below about 1 amp.

In some embodiments, the system 100 can be configured to mark a specific pattern on a workpiece by modulating the current supplied to the plasma arc torch (relative to the threshold current) to control when the resulting arc attaches to (i.e., marks) the workpiece or attaches to the torch nozzle (i.e., not marking of the workpiece) while translating the torch relative to the workpiece. The result can be similar in workpiece effect to a fly cut by an industrial laser cutting system. In some embodiments, such marking involves manipulating the driver system 120 and the gantry 112 to controllably translate the plasma arc torch 102 relative to the workpiece 106. During such torch translation, the plasma arc torch 102 generates and sustains a plasma arc (e.g., pilot arc and/or transferred arc) using an electrical current provided by the power supply 116. The amount of current supplied to the torch 102 can be controllably increased or decreased (e.g., relative to the threshold current level) in coordination with torch motion to mark a specific pattern on the workpiece 106. Specifically, increasing the current above the threshold current level is adapted to electrically connect the plasma arc to the workpiece to mark the workpiece while decreasing the current below the threshold current level (but without extinguishing the plasma arc) is adapted to electrically disconnect the plasma arc from the workpiece to prevent marking of the workpiece, such that the electrical current path returns through a nozzle the plasma arc torch without contacting the workpiece (e.g., pilot arc mode). In some embodiments, the arc is supported by a non-oxidizing plasma gas (e.g., argon or nitrogen), which can be controllably dispensed by the gas controller 118. The threshold current level can be determined based on one or more of torch height, workpiece material type, installed consumables type and/or condition, gas selection, torch motion speed, ambient air conditions, etc.

Figure 12:
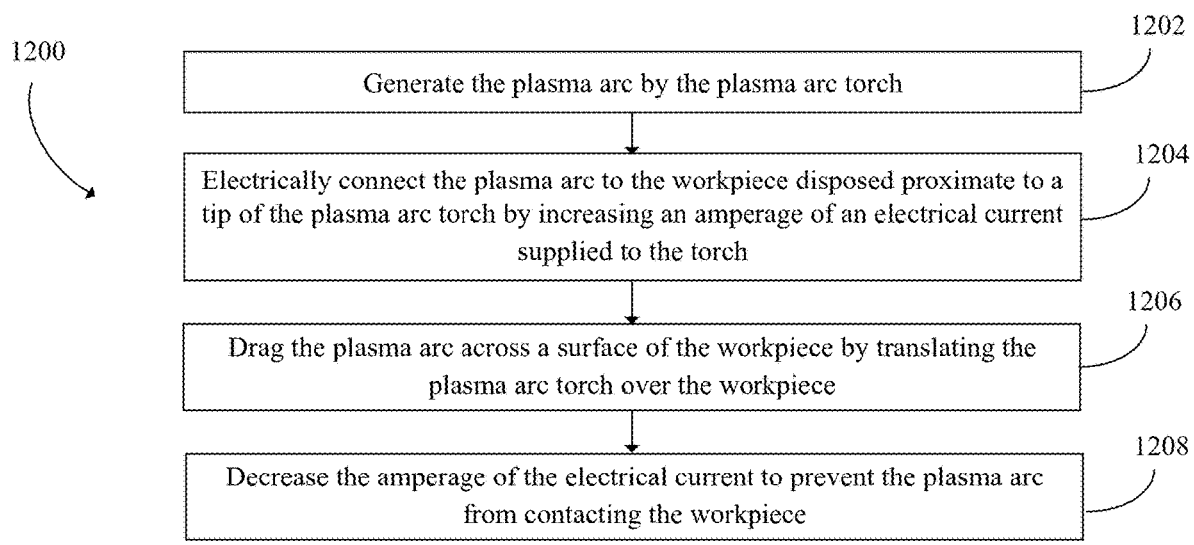
FIG. 12 shows an exemplary computerized process for automatically marking a workpiece by controllably attaching a plasma arc generated by the plasma arc torch of the plasma arc processing system of FIG. 1 to the workpiece, according to some embodiments of the present invention.

FIG. 12 shows an exemplary computerized process 1200 for automatically marking a workpiece by controllably attaching a plasma arc generated by the plasma arc torch 102 of the plasma arc processing system 100 of FIG. 1 to the workpiece, according to some embodiments of the present invention. The marking process 1200 starts with the plasma arc torch 102 generating a plasma arc (e.g., pilot arc) located between an electrode and a nozzle of the torch 102 (step 1202). To mark the workpiece 106, the amperage of the current supplied to the torch 102 is increased above a current threshold (e.g., above 5 amps, such as between about 15 amps to about 25 amps) such that the arc electrically connects to the workpiece (step 1204). At this elevated current value, the system 100 drags the plasma arc along a surface of the workpiece by translating the plasm arc torch over the workpiece in a desired marking path (step 1206). The translation of the plasma arc torch 102 can be accomplished by manipulating the driver system 120 and the gantry 112 of the system 100. During the dragging, the plasma arc is adapted to contact the workpiece 106 such that the electrical current of the plasma arc attaches to the workpiece 106 and marks the workpiece 106. Once the mark is completed, the processor 104 decreases the amperage of the current supplied to the torch 102 (e.g., below about 5 amps, but at or above about 1 amp) such that the plasma arc no longer contacts the workpiece 106 to mark the workpiece 106, in which case the current of the arc detaches from the workpiece 106 and reattaches to the nozzle of the torch 102 (step 1208). In some embodiments, during this pause in marking, the system 100 can translate the torch to a new location relative to the workpiece 106 before starting a new mark. When at the new location, the system 100 can repeat steps 1202 to 1208 by increasing the amperage of the current supplied to the torch 102 to electrically reconnect the plasma arc to the workpiece 106 such that the electric current detaches from the torch nozzle and reattaches to the workpiece 106. In general, the processor 104 of the system 100 can selectively increase and decrease the electrical current while translating the plasma arc torch 102 over the workpiece at specific locations to mark a desired pattern on the surface of the workpiece 106. In some embodiments, the system 100 makes a series of marks by altering the current amperage and torch lateral locations, but without changing gas flow and/or torch height. In some embodiments, the marking current remains relatively constant during marking and the non-marking current remains relatively constant in between marking.

Figure 13:
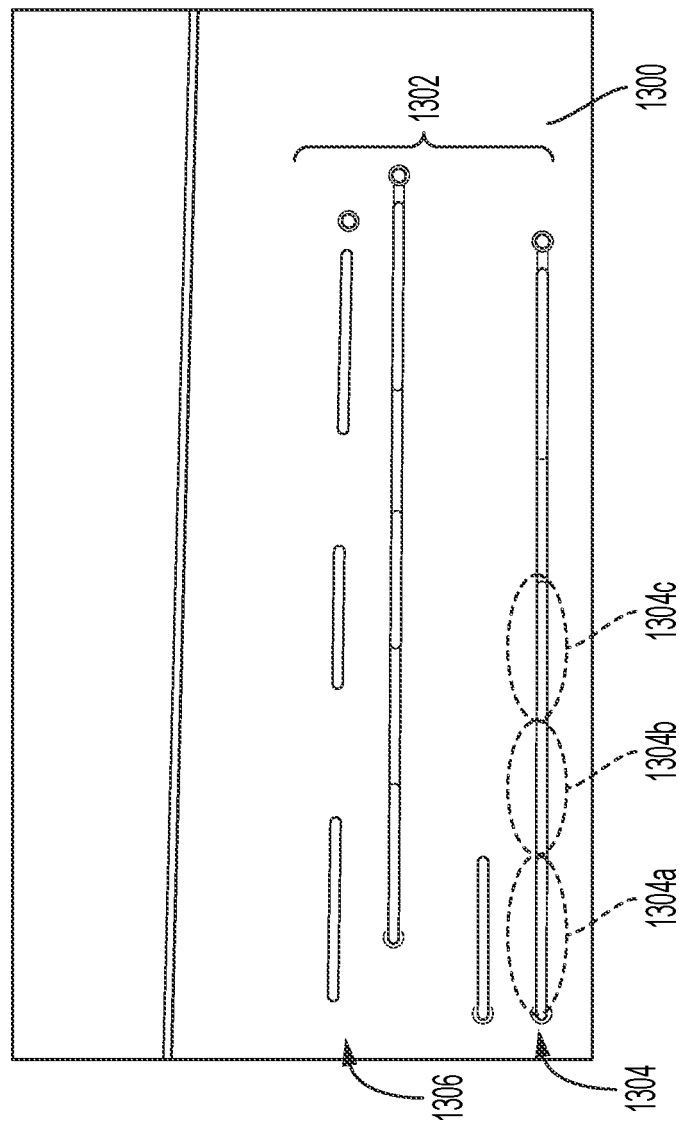
FIG. 13 shows an exemplary series of marks made on a workpiece by the plasma arc processing system of FIG. 1 using the process of FIG. 12, according to some embodiments of the present invention.
Figure 14:
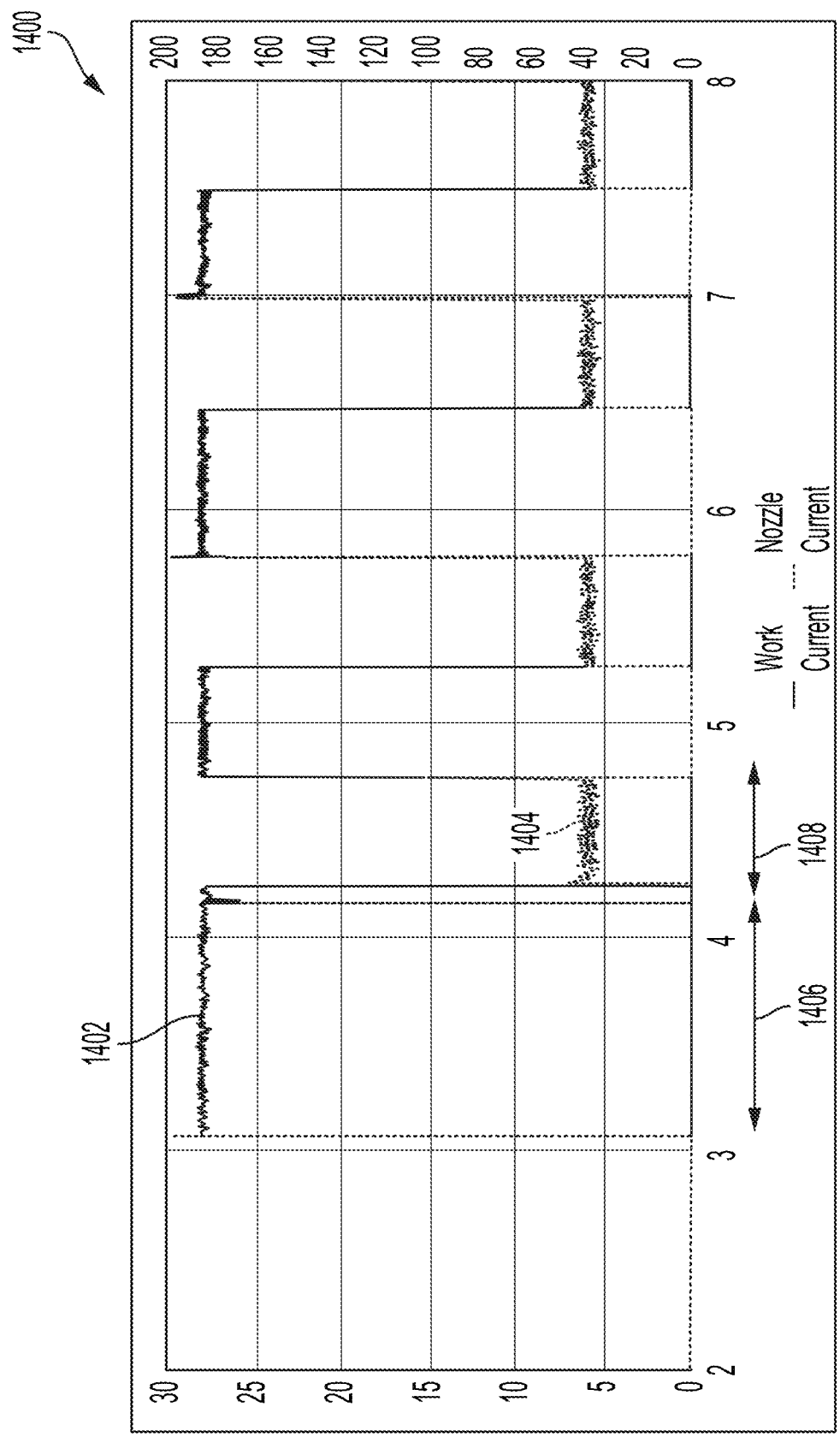
FIG. 14 shows a current trace diagram corresponding to the marking operation used to generate the marked workpiece of FIG. 13, according to some embodiments of the present invention.

FIG. 13 shows an exemplary series of marks made on a workpiece 1300 by the plasma arc processing system 100 of FIG. 1 using the process 1200 of FIG. 12, according to some embodiments of the present invention. FIG. 14 shows a current trace diagram 1400 corresponding to the marking operation used to generate the marked workpiece 1300 of FIG. 13, according to some embodiments of the present invention. As shown in FIG. 13, the marking process 1200 produces a series of high-quality marked/dashed lines 1302 on the surface of the workpiece 1300 without piercing the workpiece 1300. Specifically, to produce a connected dashed line as shown in the bottom row 1304 of the series of marks 1302 on the workpiece 1300, the torch current between two heavy marks 1304a and 1304c can be reduced from about 15 amps to about 5 amps such that the low current can still attach to the workpiece 106 to leave a faint mark 1304b, thereby increasing the standoff leads to the back and forth transfer of the arc. To produce a broken line of marks as shown in the top row 1306 such that the workpiece 1300 is not marked at all between two marks, the applied torch current between the two marks can be reduced to be lower than about 5 amps, such as to about 1 amp. The corresponding trace diagram 1400 of FIG. 14 includes a current curve 1402 illustrating the amount of current measured through the workpiece 1300 of FIG. 13 over time and a current curve 1404 illustrating the amount of current measured through the nozzle of the torch 102 over time during the marking operation. As shown, a higher level of current is transferred to the workpiece 1300 when a line is marked on the workpiece 1300 (e.g., over duration 1406) in comparison to a lower level of current that is transferred to the nozzle of the torch 102 when there is a pause in between the line markings (e.g., over duration 1408).

In general, the automated processes described above with respect to FIGS. 2-11 have broad applications across the metal foundry industry and can be integrated with a wide range of plasma arc processing systems. In some applications, an automated process (such as based on one of the processes described above with reference to FIGS. 2-11) is executed by certain software of a plasma arc processing system to run a sample routine about an exterior of a workpiece to precisely locate and mark the edge(s) of the workpiece. This can be accomplished by the software controlling the torch of the system to run a series of short marks off of an edge of the workpiece in an advancing fashion that defines the perimeter. The marked locations can be logged and processed by the system software to map the boundary of the workpiece, thereby enabling optimization of raw plate processing, edge starts for this processing, and/or a quick overall processing. In some embodiments, the markings on the workpiece occur as a side effect of the torch movement for the purpose of edge detection, but are not intentionally produced.

More specifically, this process is used to determine the border of a raw workpiece 106 by sampling and marking the border using the plasma arc processing system 100 of FIG. 1 as the workpiece 106 is placed in its final position on the cutting table 108 of the system 100. In some embodiments, the sampling and marking are only performed in the areas where scrap cuts need to start. For this application, the plasma arc processing system 100 is preferably equipped with an integrated torch height controller 118 and a processor 104 that can generate a log file capable of periodically recording (e.g., every millisecond) the lateral and vertical (X, Y, Z) positions of the torch 102 and the arc status/feedback of the torch (e.g., where the plasma arc is returning from—the workpiece 106 or the nozzle of the torch 102). The system 100 also includes Computer Aided Manufacturing (CAM) software capable of handling plasma cutting or marking. For this application, an operator can first create a set of sampling sequences, which include a series of sampling lines to be marked. These lines can be numbered and have lengths determined according to one or more of the tolerance on dimensions of the raw workpiece, the tolerance on inclination of the raw workpiece when loading and positioning it onto the cutting table 108, the dimension of the final format and/or the maximum lengths of the scrap pieces.

Figure 15:
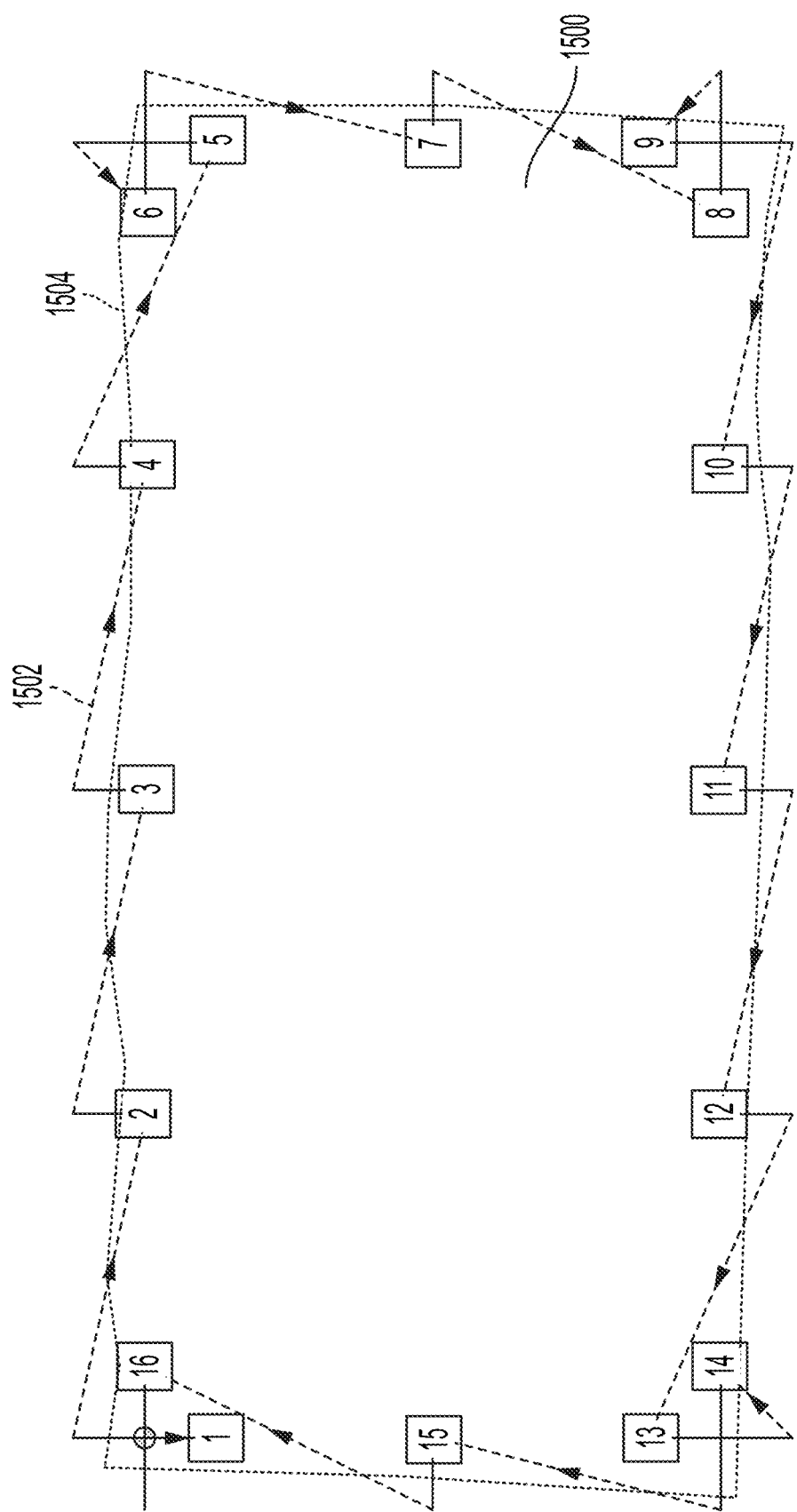
FIG. 15 shows an exemplary sampling sequence of lines generated by the plasma arc system of FIG. 1 for use by the system to sample and mark the border of a workpiece 1500 without knowing a priori the border, according to some embodiments of the present invention.

FIG. 15 shows an exemplary sampling sequence of lines 1502 generated by the plasma arc system 100 of FIG. 1 for use by the system 100 to sample and mark the border 1504 of a workpiece 1500 without knowing a priori the border, according to some embodiments of the present invention. As shown, the border 1504 of the workpiece 1500 can be substantially raw, i.e., uneven. For this workpiece 1500, a 4 meter-by-2 meter rectangular final format needs to be allocated (i.e., cut from the workpiece 1500) and the scrap pieces need to have a maximum length of 1 meter.

The sampling sequence of lines 1502 for determining the border 1504 of the workpiece 1500 is executed by the plasma arc torch 102 in the marking mode as described above. As the torch moves through the sequence, each marked line 1502 is generated from the inside of the workpiece 1500 to the outside of the workpiece 1500, or vise versa, and is associated with a length that requires the torch to go over an edge of the workpiece 1500, thereby triggering change in (e.g., loss of) a feedback signal (herein referred to as an ArcOn signal) that indicates the plasma arc is over a void region because it is rapidly extinguished and/or returns from the torch nozzle instead of the workpiece 1500. Therefore, the position along each line 1502 at which the ArcOn signal changes indicates detection of a border point of the workpiece 1500. In general, by tracking the ArcOn signal changes and their corresponding positions along the sampling sequence of lines 1502, the system 100 can effectively estimate the entire border 1504 of the workpiece 1500. In some embodiments, once the torch 102 goes off the workpiece 1500 by following a sample line 1502, the system 100 can (i) maintain the arc at a low-amperage current until the torch returns to the workpiece 1502 using the extended arc technique described above with respect to FIGS. 7 and 8, or (ii) extinguish and then re-fire the arc at a low-amperage current until the torch returns to the workpiece 1502 using the arc re-firing technique described above with respect to FIGS. 9-11. In some embodiments, the torch travels a set difference away from the workpiece edge after such an event and then changes directions/returns to the workpiece at a non-normal angle to its path of departure from the workpiece to determine a second edge data point/location in its return over the workpiece. The torch then continues to travel over the workpiece for a set difference with the arc transferred and sensing the workpiece and then changes course again back toward the edge at a non-normal angle to its current path of travel. This zig-zag pattern can be a continuous signal or can be rapidly marking.

In some embodiments, the processor 104 is programmed to include a parameter that is set to a predetermined time period during the execution of the sampling/marking sequence to allow the torch 102 to follow a sample line 1502 that runs off the workpiece 1500 without the system 100 triggering an alarm, automatically extinguishing the plasma arc and/or stopping between the lines 1502. For example, the predetermined time period can be 2 seconds. In some embodiments, before running the sampling sequence 1502, the operator performs any one of a number of preparation steps, including setting the corners of the workpiece 1500, resetting the position log file and/or set the torch height controller 118 to operate without arc voltage so that the sampling sequence 1502 can be executed at a fixed height of the torch 102. In some embodiments, at the end of the execution of the sampling sequence 1502, the operator can save and access the log file that tracks pertinent data related to the sampling of marked lines.

Figure 16:
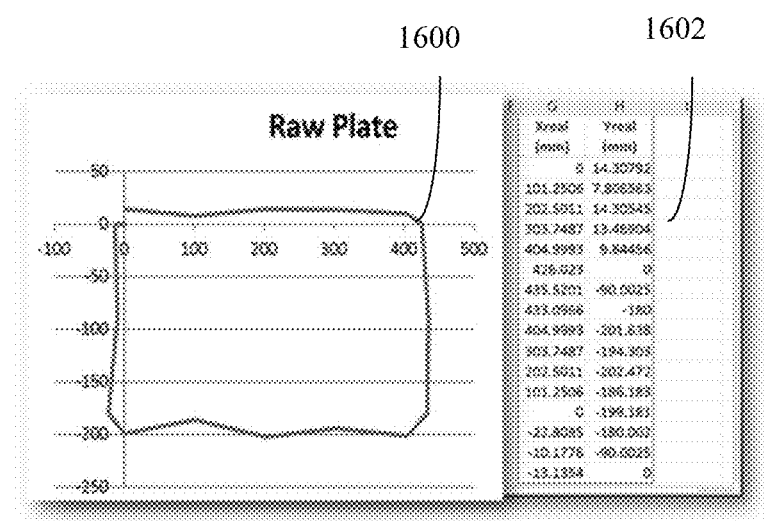
FIG. 16 shows an exemplary approximated mapping of the border of the workpiece of FIG. 15 using the results generated from the sampled path of FIG. 15, according to some embodiments of the present invention.

After the sampling routine is completed, a specialized processing software application of the system 100 can process the resulting log file to extract the lateral (XY) positions of the locations where the ArcOn signal switches along each sampled line 1502, which represent intersections of the actual workpiece border 1504 and the torch path comprising the marked lines 1502 (shown in FIG. 15). These positions effectively provide a mapping of the workpiece 1500. FIG. 16 shows an exemplary approximated mapping 1600 of the border 1504 of the workpiece 1500 of FIG. 15 using the results generated from the sampled path 1502, according to some embodiments of the present invention. The XY positions 1602 at which the ArcOn signal switches along each sampled line 1502 can also be displayed. In some embodiments, the processing application can further process and/or display the heights of the torch height controller 118 at these positons (not shown on FIG. 16). In some embodiments, the processing application processes the sampling results by considering one or more of: the XY scale factor, the torch height controller scale factor, the ArcOn signal feedback, any error message from the power supply 116, the arc voltage profile, the backpressure profile, the arc response technology, the propagation delay, the sampling/marking speed, the mG rates of the system 100 at the sampling/marking speed and/or the parameters of the marking process.

In some embodiments, in addition to the processing application providing an estimated mapping 1600 of the workpiece 1500, the processing application can also automatically generate and output a cutting program customized to the workpiece 1500. For example, the processing application can quickly and efficiently determine the "best fit" of the final format, including a reference repositioning, if needed, due to the inclination of the workpiece 1500. The processing application can also insert the kerf for a selected cutting process, insert special cutting techniques if applicable (i.e. progressive slow-down for stainless steel) and/or execute first an edge-start trim cuts that avoids using the sampling lines 1502 but uses the estimated border 1600 of the final format, which can result in large increase(s) in consumable life and no ramp-down errors by cutting beyond the actual border 1504 of the workpiece 1500. The processing application can further cut the bottom and the top of the final format, including the part of the workpiece for mechanical tests and/or set at the end of the sequence two longitudinal cuts that can be realized in single-head mode or twin-head mode if available, preferably if the final format does not need any inclination during the best-fit adjustment.

Figure 17:
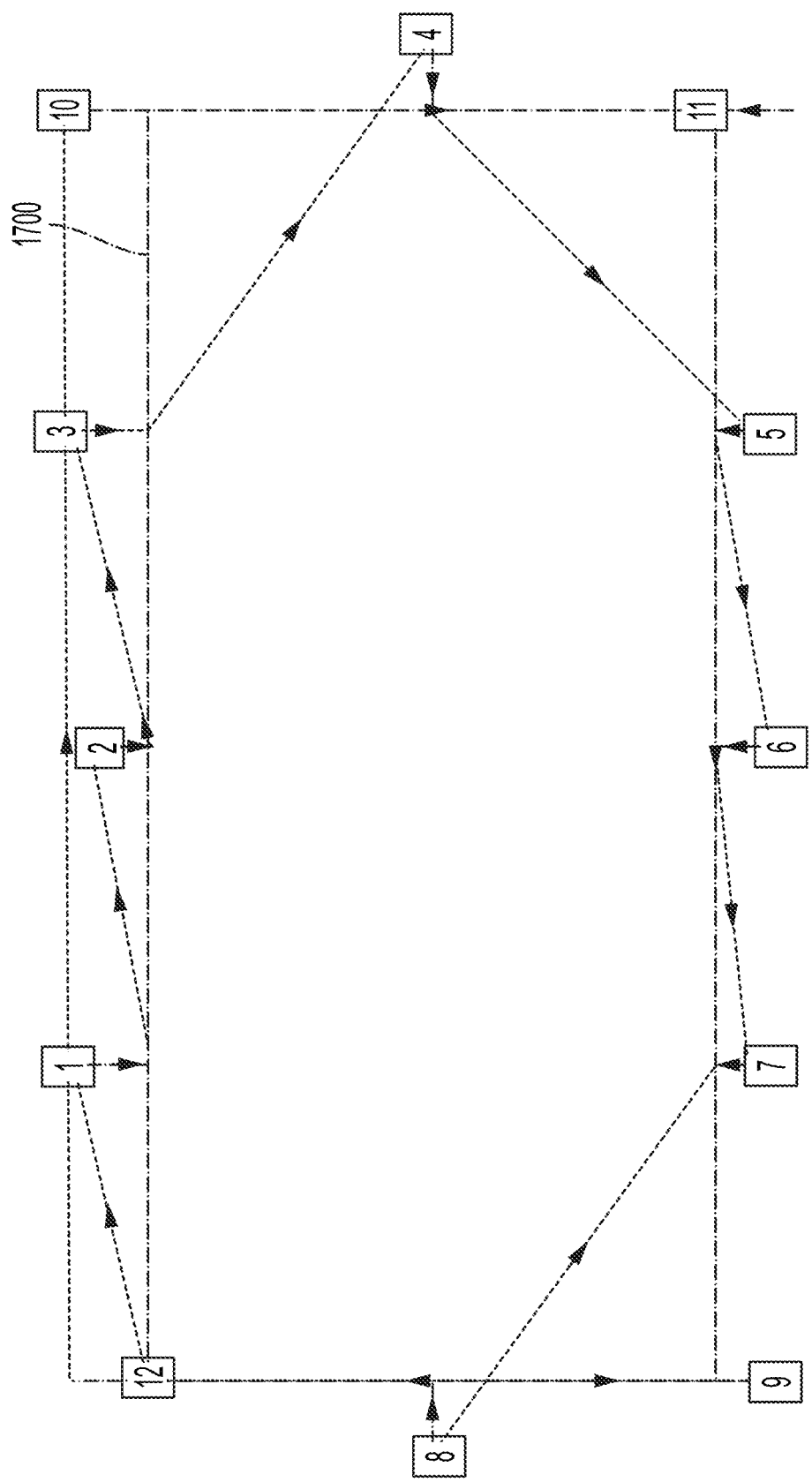
FIG. 17 shows an exemplary final format generated by the plasma arc processing system of FIG. 1 based on the sampling routine of FIG. 15 and the approximated mapping of the workpiece of FIG. 16, according to some embodiments of the present invention.

FIG. 17 shows an exemplary final format 1700 generated by the plasma arc processing system 100 of FIG. 1 based on the sampling routine 1502 of FIG. 15 and the approximated mapping 1600 of the workpiece 1500 of FIG. 16, according to some embodiments of the present invention. As shown, the final format 1700 to be cut out from the workpiece 1500 can have a standard shape (e.g., rectangular) and is entirely within the border of the workpiece 1500 while minimizing the scraps generated.

Figure 18:
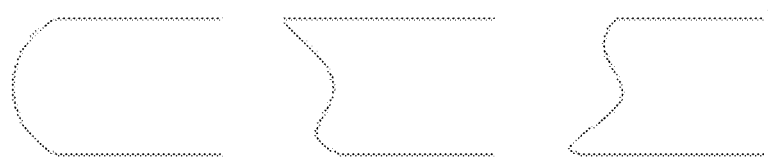
FIG. 18 shows exemplary cutting paths for cutting various workpiece edge shapes, according to some embodiments of the present invention.

In some embodiments, while performing the cut program for the final format 1700, a part program created by the processing application can drive the cutting head directly to the correct starting height (based on the processing results described above with respect to FIG. 16) in order to bypass any possible issues related to the real shape of the edge of the workpiece 1500 in the starting point. FIG. 18 shows exemplary cutting paths for cutting various workpiece edge shapes, according to some embodiments of the present invention. Specifically, FIG. 18 shows paths of travel along the edges of workpieces of different sizes and/or shapes to locate these edges.

In yet another aspect, the computerized process 200 of FIG. 2 is used to automatically determine one or more characteristics of the workpiece 106 by supplying and/or receiving (e.g., via the torch 102) an electrical current to the workpiece 106 via the work clamp 114 of the plasma arc processing system 100 of FIG. 1. The resulting measurements taken at the workpiece 106 (e.g., its thickness and/or voltage) can be used to determine certain characteristics of the workpiece 106, such as its material type and resistivity.

In some embodiments, the work clamp 114 includes two wires (not shown in FIG. 1) configured to be in electrical communication with the workpiece 106. A known electrical current can be applied across the workpiece 106 through the wires of the work clamp 114 and the resulting voltage through the workpiece 106 can be measured. In some embodiments, the current applied has a low amperage, such as below about 20 amps. In some embodiments, the work clamp 114 includes a sensor (not shown), such as a capacitive sensor (e.g., a digital caliper), to measure the material thickness of the workpiece 106 based on the electrical current applied across the workpiece 106 via the wires. In some embodiments, the system 100 includes an electrical switch (not shown), in electrical communication with the work clamp 114, configured to control the supply of the electrical current to the work clamp 114 for the purpose of making these measurements and/or adjusting current path from work clamp 114 transitioning its function from sensing to grounding for processing. In a normal processing operation (e.g., a cutting or marking operation), the work clamp 114 serves as an electrical ground for the workpiece 106. Therefore, no current is supplied to the work clamp 114 during a processing event. The electrical current can only be supplied to the work clamp 114 when the system 100 is used to determine the one or more characteristics of the workpiece 106. In this case, the switch is configured to (i) permit the electrical current to flow through the work clamp 114 for determining the at least one characteristic of the workpiece or (ii) prevent the supply of the electrical current to the work clamp 114 such that the work clamp electrically grounds the workpiece.

In some embodiments, the work clamp 114 samples the workpiece 106 a number of times as discussed herein and analyzes (e.g., via artificial intelligence) the results to identify the material type and/or thickness. In some embodiments, the system 100 cuts a small portion of the workpiece 106 (e.g., a corner section of size about 2 inches by 2 inches), which is then connected to the work clamp 114 for material identification (e.g., type, thickness, condition, etc.). With the thickness and total size/surface area of the small portion known by the system the resistivity can be determined via the calculation: resistance=pl/a where a is surface area, l is thickness, and p is resistivity. With resistivity determined a lookup table of resistivity values can be used by system 100 to determine material type. In some embodiments, the current applied to the work clamp 114 has a high amperage (e.g., over 100 A, up to 1000 A, etc.). In some embodiments ambient temperature is factored into the workpiece characteristic determination.

In some embodiments, the current applied to the workpiece via the wires and the voltage measured can be used by the system 100 to calculate the resistance of the workpiece 106 using Ohm's Law. In some embodiments, the system can compute the resistivity of the workpiece using the material thickness measured by the sensor attached to the work clamp 114, the resistance calculated, and the area of the workpiece. Further, in some embodiments, the area of the workpiece can be determined by the system 100 using the automatic boundary detection process described above with reference to FIGS. 2-8. In some embodiments, the resistivity can be compared to a database of known values to determine the material type of the workpiece. In some embodiments, an operator inputs preferred settings for certain material type and thickness combinations into the system 100 so that when a workpiece with the specific type and thickness is measured and identified by the system 100, the system 100 is automatically self-configured to the operator's preferred settings rather than the factory presets. In some embodiments, the system 100 monitors performance during a processing operation (e.g., cutting or marking) by monitoring signals to the work clamp. For example, work current stability may be a sign of torch blowout.

In some embodiments, a non-oxidizing gas (e.g., argon or nitrogen) is used as a plasma gas in various processes of the present invention to reduce component wear. In some embodiments, the low-current plasma arc generated for the purpose of edge detection and fly marking application is different from the traditional pilot arc generated by plasma arc torches prior to a cutting/marking operation at least because the traditional pilot arc does not attach/transfer to workpieces but the low-current arc of the present invention does.

In some embodiments, the system 100 includes a set of special identification process settings that set and/or determine the power supply settings to perform an identification of the edges/bounds of the workpiece. These settings include, but are not limited to, current, gas flow and gas type. One or more embodiments of the present invention can use each of a pilot method and/or standard identification method when preparing for and then making a regular cut on the same nest; the addition of a "pilot" output signal from the power supply which is in addition to the existing "Motion or Transfer" signals enables operators and/or CNC manufacturers to develop, hone, and/or tailor their own cutting current alignment methods. In some embodiments, the set of special identification process settings is combined with the use of controlling the current magnitude/value to move the arc from the plate to the nozzle, which can also be accomplished by height, flow or other pilot arc circuit components and/or adjustments. In some other embodiments, the set of special identification process settings is combined with the use of ramp down error detection to initiate a different cutting or starting mode in the power supply; and auto restart in a long pilot arc condition after the run-off the plate condition. In some embodiments, the existing/traditional marking process settings can be used by the plasma arc system 100 to detect workpiece boundary by monitoring the locations where the plasma arc extinguishes as the arc runs off of the workpiece (e.g., where the ArcOn feedback signal changes).

In some embodiments, based on the characteristics of the workpiece determined using the techniques described above, the system 100 is capable of automatically adjusting parameters associated with processing (e.g., cutting or marking) the workpiece. For example, the automatic material detection system described above can automatically determine material type and/or thickness and automatically optimize system settings (e.g., amperage, pressure, gas type, etc.) in accordance with the detected characteristics. In addition, automatically adjusting parameters associated with processing the workpiece can involve designing efficient nest and/or part programs for processing the workpiece, such as designing the cutting program described above with reference to FIGS. 17-18. These automated processes enable overall faster and more reliable identification of workpiece material and dimensional characteristics. The embodiments described herein also enable more effective workpiece utilization and/or expand the types of material that can be processed using a mechanized plasma arc processing system. In addition, these embodiments do not delay/slow down processing operations because an extended arc can be maintained without frequently initiating and extinguishing the arc. For example, the fly marking process described above with reference to FIGS. 9-11 permits fast marking with minimized start/stop divots and lengthens life for long arc processes by using low current and Argon as plasma gas. Further, improved workpiece edge starting and/or three-dimensional starting can be achieved using the long/extended arc.

Therefore, the above-described systems and methods facilitate the usage of plasma arc processing systems by requiring less knowledge and/or expertise from the operator and eliminating potential operator errors that can occur during changing system settings. Another advantage of the present invention comprises reducing the cost of workpiece boundary mapping and edge detection at least because no additional hardware is needed. Yet another advantage comprises extending the thickness range of the workpiece that can be cut by a plasma arc processing system as the cutting consumables are no longer reliant on piercing to initiate a cut. Specifically, because the present invention allows workpiece boundaries to be mapped/detected, a cutting operation does not need to start with a pierce inside of the workpiece, but can start from the edge of the workpiece. For example, a torch may pierce workpieces of mild steel up to 50 millimeter thickness with a consumable's life estimated of about 300 piercings, while the same consumable can cut workpieces of the same material type up to 80 millimeter thickness by starting from the edge of the workpieces without the usage of pierce start, while achieving a much longer consumable life. The thickness range is even more sensitive in the case of stainless steel, where a torch may be limited to piercing stainless steel workpieces up to 80 millimeter thickness, but is able to reach cutting of workpieces of the same material type up to 160 millimeter thickness by starting from the edge of the workpieces. Thus the present invention is able to increase productivity while reducing consumption of consumables.

It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A computerized method for automatically determining at least one characteristic of a workpiece for processing by a plasma arc processing system, the method comprising:

electrically connecting the workpiece to the plasma arc processing system that includes a plasma arc torch, wherein a distal tip of the plasma arc torch is configurable to be positioned proximate to the workpiece;

supplying, by the plasma arc processing system, an electrical current with a low amperage to the workpiece, the low electrical amperage current insufficient to cut the workpiece;

monitoring, by a processor of the plasma arc processing system, a path of the electrical current relative to the workpiece; and determining, by the processor of the plasma arc processing system, the at least one characteristic of the workpiece based on the electrical current path monitored.

2. The computerized method of claim 1, further comprising adjusting a cutting or marking process to be performed on the workpiece by the plasma arc torch based on the at least one characteristic of the workpiece determined.

3. The computerized method of claim 1, wherein the plasma arc processing system supplies the electrical current to the workpiece via a plasma arc generated by the plasma arc torch.

4. The computerized method of claim 3, further comprising supporting, by the plasma arc torch, the plasma arc with a non-oxidizing gas.

5. The computerized method of claim 3, further comprising:

translating the plasma arc torch relative to the workpiece;

generating, by the plasma arc torch, the plasma arc during the torch translation; and monitoring the path of the electrical current carried by the plasma arc as the plasma arc torch translates relative to the workpiece over time, wherein the at least one characteristic of the workpiece is a boundary of the workpiece determined based on variations in the monitored electrical current path over time during the translation.

6. The computerized method of claim 5, wherein determining the path of the electrical current comprises determining if the electrical current travels through the workpiece or through a nozzle of the plasma arc torch without contacting the workpiece.

7. The computerized method of claim 6, wherein the electrical current traveling through the workpiece indicates the plasma arc impinging on the workpiece and the electrical current returning without contacting the workpiece indicates the plasma arc encountering a void region within an outer boundary of the workpiece or beyond the outer boundary of the workpiece.

8. The computerized method of claim 7, further comprising adjusting a direction of translation of the plasma arc torch before the plasma arc torch translating more than a predefined distance into the void region.

9. The computerized method of claim 7, wherein the plasma arc impinging on the workpiece marks the workpiece without cutting the workpiece.

10. The computerized method of claim 5, further comprising mapping a perimeter of the workpiece by translating the plasma arc torch in at least one of a substantially serpentine or stepwise path relative to the workpiece.

11. The computerized method of claim 3, wherein the at least one characteristic of the workpiece determined comprises a threshold of supplied electrical current at or above which the electrical current path travels through the workpiece such that the plasma arc marks the workpiece.

12. The computer method of claim 11, further comprising:

translating the plasma arc torch relative to the workpiece;

generating, by the plasma arc torch, the plasma arc during the torch translation; and controllably increasing or decreasing the electrical current supplied by the plasma arc torch relative to the threshold electrical current while translating the plasma arc torch to mark a desired pattern on the workpiece.

13. The computer method of claim 12, wherein decreasing the electrical current below the threshold electrical current electrically disconnects the plasma arc from the workpiece to prevent marking of the workpiece, such that the electrical current path returns through a nozzle of the plasma arc torch without contacting the workpiece.

14. The computerized method of claim 11, wherein the threshold electrical current is 5 amps.

15. The computerized method of claim 1, wherein the plasma arc processing system supplies the electrical current to the workpiece via a work clamp connected to the plasma arc processing system.

16. The computer method of claim 15, wherein the work clamp includes a sensor configured to determine a thickness of the workpiece based on the electrical current path.

17. The computer method of claim 15, wherein the at least one characteristic of the workpiece is one of thickness, resistivity or material type of the workpiece.

18. The computer method of claim 15, wherein the work clamp includes at least two wires for delivering the electrical current to the workpiece.

19. The computer method of claim 15, further comprising controlling the supply of the electrical current to the workpiece via the work clamp using a switch of the plasma arc processing system in electrical communication with the work clamp, the switch configured to (i) permit the electrical current to flow through the work clamp for determining the at least one characteristic of the workpiece or (ii) prevent the supply of the electrical current to the work clamp such that the work clamp electrically grounds the workpiece.

20. A computer-implemented plasma arc processing system for automatically determining at least one characteristic of a workpiece for processing the workpiece in accordance with the method of claim 1, the system comprising:

a work clamp configured to secure to the workpiece in preparation for processing by the plasma arc torch; and a power supply in electrical communication with the plasma arc torch and the work clamp, the power supply configured to supply the low-amperage electrical current to the workpiece, the low amperage electrical current insufficient to cut the workpiece;

wherein the processor is in electrical communication with the plasma arc torch, the work clamp and the power supply, the processor configured to monitor the path of the electrical current relative to the workpiece and determine the at least one characteristic of the workpiece based on the electrical current path monitored.

21. The computer-implemented plasma arc processing system of claim 20, wherein the power supply is configured to supply the electrical current via a plasma arc generated by the plasma arc torch.

22. The computer-implemented plasma arc processing system of claim 21, further comprising a motion device connected to the plasma arc torch and in electrical communication with the processor, the motion device configured to translate the plasma arc torch relative to the workpiece while the plasma arc torch generates the plasma arc.

23. The computer-implemented plasma arc processing system of claim 22, wherein the processor is configured to monitor the path of the electrical current carried by the plasma arc as the plasma arc torch translates relative to the workpiece over time to determine a boundary of the workpiece based on variations of the electrical current path monitored during the translation.

24. The computer-implemented plasma arc processing system of claim 23, wherein the processor determines the path of the electrical current by determining if the electrical current travels through the workpiece or returns through a nozzle of the plasma arc torch without contacting the workpiece.

25. The computer-implemented plasma arc processing system of claim 23, wherein the processor is further configured to map a perimeter of the workpiece by causing the motion device to translate the plasma arc torch in at least one of a substantially serpentine or stepwise path relative to the workpiece.

26. The computer-implemented plasma arc processing system of claim 22, wherein the at least one characteristic of the workpiece determined by the processor comprises a threshold electrical current supplied to the plasma arc torch at or above which the electrical current path travels through the workpiece such that the plasma arc marks the workpiece.

27. The computer-implemented plasma arc processing system of claim 26, wherein the processor is configured to controllably increase or decrease the electrical current supplied by the plasma arc torch relative to the threshold electrical current while causing the motion device to translate the plasma arc torch over the workpiece to mark a desired pattern on the workpiece.

28. The computer-implemented plasma arc processing system of claim 20, wherein the power supply is configured to supply the electrical current to the workpiece via the work clamp.

29. The computer-implemented plasma arc processing system of claim 28, wherein the work clamp includes at least two wires for delivering the electrical current to the workpiece.

30. The computer-implemented plasma arc processing system of claim 28, wherein the work clamp includes a sensor in electrical communication with the processor, the sensor configured to determine a thickness of the workpiece based on the electrical current path.

31. The computer-implemented plasma arc processing system of claim 30, wherein the at least one characteristic of the workpiece determined by the processor is one of resistivity or material type of the workpiece calculated based on the thickness of the workpiece.

32. The computer-implemented plasma arc processing system of claim 28, further comprising a switch in electrical communication with the processor and the work clamp, the switch configured to (i) permit the electrical current to flow through the work clamp for determining the at least one characteristic of the workpiece or (ii) prevent the supply of the electrical current to the work clamp such that the work clamp electrically grounds the workpiece.

33. The computer-implemented plasma arc processing system of claim 28, wherein the work clamp is configured to pass the electrical current to the workpiece via an intermediate conductive component.

\* \* \* \* \*